United States Patent
Moniruzzaman et al.

(10) Patent No.: US 11,572,509 B2
(45) Date of Patent: Feb. 7, 2023

(54) IONIC LIQUIDS FORMULATION AS AN ENVIRONMENTALLY FRIENDLY OIL DISPERSANT

(71) Applicant: PETROLIAM NASIONAL BERHAD, Kuala Lumpur (MY)

(72) Inventors: Muhammad Moniruzzaman, Perak Darul Ridzuan (MY); Mohamed Ibrahim Abdul Mutalib, Perak Darul Ridzuan (MY); Siti Hawatulaila Baharuddin, Perak Darul Ridzuan (MY); Noorul Adawiyah Mustahil, Perak Darul Ridzuan (MY); Atikah Aini Abdullah, Perak Darul Ridzuan (MY); Magaret a/p Sivapragasam, Perak Darul Ridzuan (MY); Cecilia Devi Wilfred, Perak Darul Ridzuan (MY)

(73) Assignee: PETROLIAM NASIONAL BERHAD, Kuala Lumpur (MY)

(*) Notice: Subject to any disclaimer, the term of this patent is extended or adjusted under 35 U.S.C. 154(b) by 148 days.

(21) Appl. No.: 17/278,526

(22) PCT Filed: Sep. 20, 2019

(86) PCT No.: PCT/MY2019/050062
§ 371 (c)(1),
(2) Date: Mar. 22, 2021

(87) PCT Pub. No.: WO2020/060389
PCT Pub. Date: Mar. 26, 2020

(65) Prior Publication Data
US 2022/0032249 A1 Feb. 3, 2022

(30) Foreign Application Priority Data
Sep. 21, 2018 (MY) .............................. 2018001613

(51) Int. Cl.
C02F 1/68 (2006.01)
C09K 23/00 (2022.01)
C02F 3/34 (2006.01)

(52) U.S. Cl.
CPC ............ C09K 23/018 (2022.01); C02F 1/682 (2013.01); *C02F 3/341* (2013.01); *C02F 2305/04* (2013.01)

(58) Field of Classification Search
CPC ...... C02F 1/682; C02F 2305/04; C02F 3/341; B01D 17/047; C09K 23/00; C09K 23/018
See application file for complete search history.

(56) References Cited

U.S. PATENT DOCUMENTS 3,936,571 A 2/1976 Van Hoof et al.
6,261,463 B1 7/2001 Jacob et al.
(Continued)

FOREIGN PATENT DOCUMENTS

EP 2630952 A1 8/2013

OTHER PUBLICATIONS

International Search Report and Written Opinion for corresponding Application No. PCT/MY2019/050062 (dated Jan. 23, 2020).
(Continued)

*Primary Examiner* — Magali P Slawski
*Assistant Examiner* — Brad Gordon
(74) *Attorney, Agent, or Firm* — Troutman Pepper Hamilton Sanders LLP (Rochester)

(57) ABSTRACT

Disclosed herein is an oil dispersant composition that contains an acyl amino acid ionic liquid, a dicationic ionic liquid, a fruit acid ionic liquid, a polyacid ionic liquid, and an ethoxylate oleyl ether ionic liquid. The composition may also be diluted with water. The composition is useful for dispersing an oil spill in a body of water, while being less
(Continued)

toxic to the aquatic environment and also acting to stimulate bacterial growth in said aquatic environment.

20 Claims, 6 Drawing Sheets

(56) References Cited

U.S. PATENT DOCUMENTS

| | | |
|---|---|---|
| 8,415,286 B1 | 4/2013 | McGuire |
| 2013/0310457 A1 | 11/2013 | Ranesh |

OTHER PUBLICATIONS

International Preliminary Report on Patentability for PCT/MY2019/050062 dated Apr. 1, 2021.

IONIC LIQUIDS FORMULATION AS AN ENVIRONMENTALLY FRIENDLY OIL DISPERSANT

This application is a national stage application under 35 U.S.C. § 371 of PCT Application No. PCT/MY2019/050062, filed Sep. 20, 2019, which claims the benefit of Malaysia Patent Application No. PI 2018001613, filed Sep. 21, 2018.

FIELD OF INVENTION

The current invention relates to the formation of a surfactant composed of a mixture of ionic liquids that is useful for the dispersal of oil in a body of water (an oil spill). The compositions disclosed herein may also provide a source of nutrients for a microbial population in the body of water, which microbial population may contain bacteria that may be able to assist in the dispersal of the oil.

BACKGROUND

The listing or discussion of a prior-published document in this specification should not necessarily be taken as an acknowledgement that the document is part of the state of the art or is common general knowledge.

Oil spills are a kind of pollution that often occurs upon the release of petroleum products and its derivatives into the marine ecosystem. This type of pollution may is associated with activities relates to oil production (e.g. drilling and refining the oil), as well as activities associated with transporting the oil from one location to another (e.g. by tankers, other vessels and pipelines). Generally, the release of oil into the marine ecosystem is the result of an accident, such as a pipeline break or the breaching of a vessel (e.g. due to the collision of a tanker with another object, such as another ship or rocks). Such oil spills tend to spread over many square miles of water surface and can cause serious damage to the environment. Indeed, the impact of an oil spill towards the local marine environment includes not only the acute damage caused, but also long term damage if the clean-up process is not able to effectively remove the oil from the ecosystem. This is because it takes many years for the quantity of remaining oil to diminish by natural processes, such as natural dispersion and biodegradation.

An oil spill may be cleaned up by physical means that attempt to remove and/or recover the spilled oil (e.g. an absorbent, a boomer, and an oil skimmer). Alternatively, chemical remediation can be used. Indeed, the use of an oil dispersant is generally preferable because it is an effective and efficient way to deal with large amount of oil and it also helps to reduce the environmental impact associated with the spilled oil. The use of various surfactant compositions in chemically remediating oil spills has been employed for many years.

A surfactant is a surface active agent whose molecules are composed of groups of opposing polarity and solubility, i.e., surfactants usually have both an oil-soluble hydrocarbon chain and a water-soluble group. Surfactants can be anionic, cationic, or nonionic, and they may be comprised of mixtures of any of these types of surfactants. Such surfactant mixtures often include other chemical agents, such as solvents, that enhance the dispersant capabilities of the surfactant. However, not all surfactant compositions are effective in dispersing spilled oil products and many of the more effective ones have the drawbacks of being toxic and/or not biodegradable.

There is a continuing search for "environmentally friendly" and biodegradable oil dispersants for oil spill remediation. Although many commercial dispersants are available in the market, they display the disadvantages discussed above. The selection of a dispersant for oil spill dispersion is influenced by its efficacy and environmental impact, such as toxicity and biodegradability. Furthermore, the current chemical dispersant systems usually involves three components, i.e. surfactant, chemical additives and solvent, which makes the manufacture and use expensive.

Considering these facts, an ideal oil dispersion system should not be just effective, but should also cause the least environmental harm. The use of commercially available dispersants that contain a large percentage of petroleum distillates and other hydrocarbon based dispersants is therefore counterproductive, in that it adds to the loading of the ocean with compounds of the same petrochemical class as the spill itself. In addition, the dispersing effect of a dispersant must also be balanced against its toxicity to fish and other wild life. In addition, once crude oil is spilled, it takes at least one week before any biodegradation processes begin to take effect. Therefore, it would also be beneficial to find a dispersant that can act to shorten this startup period to the absolute minimum so as to accelerate and maximize bioremediation rates from the application of the dispersant.

Ionic liquids (ILs) are a salt in which the ions are poorly coordinated, which results in these solvents being liquid, e.g. at room temperature. ILs display negligible vapour pressure, multiple solvation interactions with organic and inorganic compounds, excellent chemical and thermal stability and high ionic conductivity, amongst other properties.

SUMMARY OF INVENTION

In a first aspect of the invention, there is disclosed an oil dispersant composition, comprising:
an acyl amino acid ionic liquid;
a dicationic ionic liquid;
a fruit acid ionic liquid;
a polyacid ionic liquid; and
an ethoxylate oleyl ether ionic liquid.

In an embodiments of the first aspect of the invention the composition may further comprise water.

In further embodiments of the invention, the acyl amino acid ionic liquid may consist of:
a cation selected from one or more of the group consisting of:

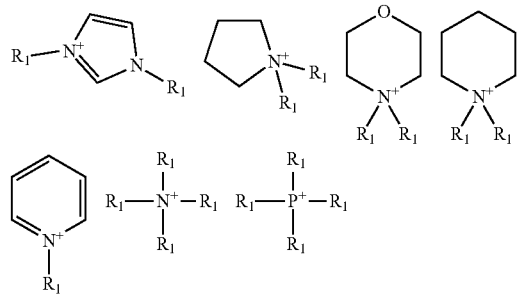

cholinium, and betaine, where each $R_1$ group is independently selected from $C_1$ to $C_4$ alkyl; and
an anion selected from one or more of the group consisting of lauroyl sarcosinate, oleoyl sarcosinate, lauroyl glutamate, oleoyl glutamate, lauroyl isethionate, and oleoyl isethionate;

In yet further embodiments of the invention, the dicationic ionic liquid has the formula I:

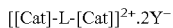

where each [Cat] group is independently a cationic group selected from:

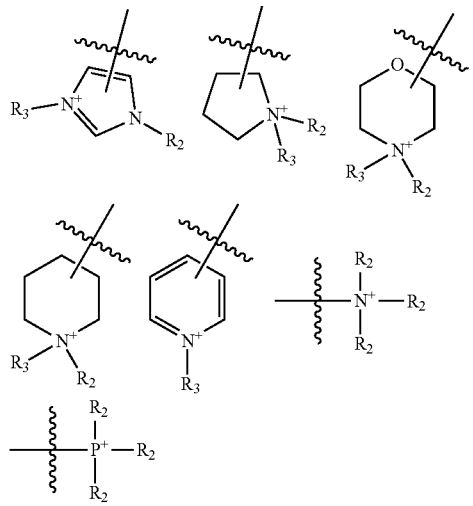

cholinium, and betaine, where:
each $R_2$ group independently represents H, or $C_1$ to $C_4$ alkyl;
each $R_3$ group independently represents $C_2$ to $C_6$ alkyl or the point of attachment of each [Cat] group to the rest of the molecule;
where the wavy line represents the point of attachment to the rest of the molecule, except in cases where the $R_3$ group represents the point of attachment to the rest of the molecule, in which case, the bond represented by the wavy line is absent;
each L independently represents a $C_2$ to $C_6$ alkylene;
each $Y^-$ is independently selected from the group consisting of a sulfonate (e.g. dodecyl benzene sulfonate and dihexylsulfosuccinate, dioctylsulfosuccinate), lauroyl sarcosinate, oleoyl sarcosinate, lauroyl glutamate, oleoyl glutamate, lauroyl isethionate, oleoyl isethionate, and a fatty acid anion (e.g. a $C_{10}$ to $C_{22}$, such as a $C_{12}$ to $C_{18}$, fatty acid anion, such as one or more of the group consisting of stearate, oleate, linoleate, palmitate, myristate, and laurate).

In yet further embodiments of the invention, the fruit acid ionic liquid may consist of:

an anionic component selected from one or more of the group consisting of citrate, lactate, succinate, glycolate, malate, and tartrate, where all carboxylic acid groups are in an anionic form; and a cationic component selected from one or more of the group consisting of:

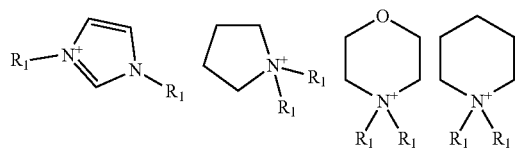

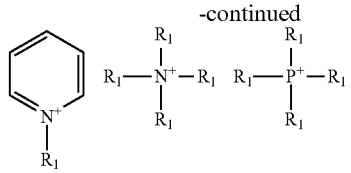

cholinium, and betaine, where each $R_1$ group is independently selected from $C_1$ to $C_4$ alkyl, and the number of cationic groups balances the number of anions in the anionic component.

In still further embodiments of the invention, the polyacid ionic liquid may consist of one or more polyphosphates in fully deprotonated form and cationic counterions selected from:

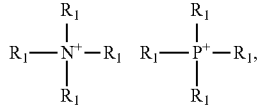

cholinium, and betaine, where each $R_1$ group is independently selected from $C_1$ to $C_4$ alkyl, and the number of cationic groups balances the number of anions in the one or more polyphosphates.

In yet still further embodiments of the invention, the ethoxylate oleyl ether ionic liquid may have the formula II:

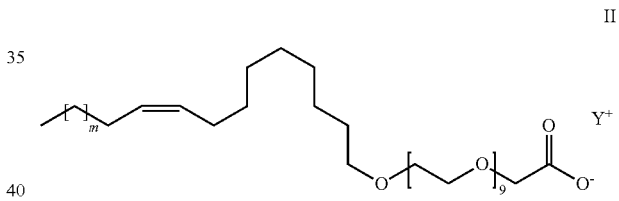

where Y is selected from:

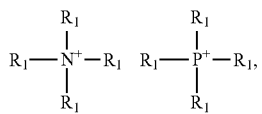

cholinium, and betaine, where each $R_1$ group is independently selected from $C_1$ to $C_4$ alkyl; and
m is from 5 to 7.

In embodiments of the invention, the composition may comprise:
(a) the acyl amino acid ionic liquid is present in an amount of from 10 to 20 wt %;
   the dicationic ionic liquid is present in an amount of from 5 to 30 wt %;
   the fruit acid ionic liquid is present in an amount of from 30 to 60%;
   the polyacid ionic liquid is present in an amount of from 10 to 20 wt %; and
   the ethoxylate oleyl ether ionic liquid is present in an amount of from 5 to 15 wt %; and/or
(b) the acyl amino acid ionic liquid is present in an amount of from 12.5 to 17.4 wt %;

the dicationic ionic liquid is present in an amount of from 8.33 to 24.6 wt %;

the fruit acid ionic liquid is present in an amount of from 35.8 to 50%;

the polyacid ionic liquid is present in an amount of from 11.6 to 16.67 wt %; and the ethoxylate oleyl ether ionic liquid is present in an amount of from 10.6 to 12.5 wt %;

In embodiments of the invention, where the composition also comprises water, the composition may be one in which:

(a) the acyl amino acid ionic liquid is present in an amount of from 2 to 15 wt %;

the dicationic ionic liquid is present in an amount of from 1 to 20 wt %;

the fruit acid ionic liquid is present in an amount of from 10 to 25%;

the polyacid ionic liquid is present in an amount of from 2 to 10 wt %;

the ethoxylate oleyl ether ionic liquid is present in an amount of from 2 to 10 wt %; and water to make 100 wt %; or (b) the acyl amino acid ionic liquid is present in an amount of from 3 to 9 wt %;

the dicationic ionic liquid is present in an amount of from 2 to 12.7 wt %;

the fruit acid ionic liquid is present in an amount of from 12 to 18.5%;

the polyacid ionic liquid is present in an amount of from 4 to 6 wt %;

the ethoxylate oleyl ether ionic liquid is present in an amount of from 3 to 5.5 wt %; and water to make 100 wt %.

In yet still further embodiments:

(a) the acyl amino acid ionic liquid may be 1-butyl-3-methylimidazolium lauroylsarcosinate;

(b) the dicationic ionic liquid may be a N-alkyl-N-methyl pyrrolidinium dodecyl benzenesulfonate of formula III:

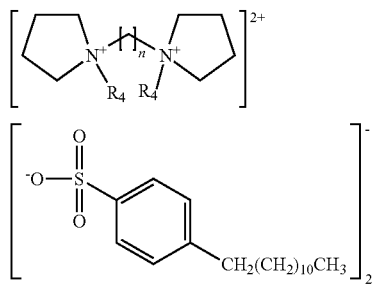

III where:

each $R_4$ independently represents H, or $C_1$ to $C_4$ alkyl; and n represents a number from 2 to 6;

(c) the fruit acid ionic liquid may be a tetraalkylammonium citrate, such as tetrabutylammonium citrate;

(d) the polyacid ionic liquid may be a tetraalkylammonium polyphosphate, such as tetrabutylammonium polyphosphate;

(e) the ethoxylate oleyl ether ionic liquid may have the formula II:

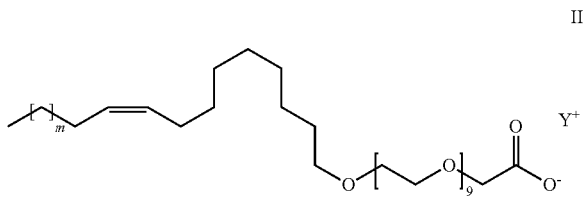

II where Y is a tetralkylammonium, such as tetrabutylammonium; and m is 6 or 7.

In embodiments of the invention, the composition may be one in which:

the acyl amino acid ionic liquid is 1-butyl-3-methylimidazolium lauroylsarcosinate;

the dicationic ionic liquid is a N-alkyl-N-methyl pyrrolidinium dodecyl benzenesulfonate of formula III as defined above;

the fruit acid ionic liquid is tetrabutylammonium citrate;

the polyacid ionic liquid is tetrabutylammonium polyphosphate; and the ethoxylate oleyl ether ionic liquid has the formula II:

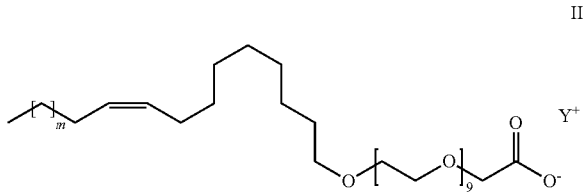

II where Y is tetrabutylammonium and m is 6.

For the avoidance of doubt, any of the above mentioned embodiments of the first aspect of the invention may be combined with the first aspect itself and any other technically sensible embodiment to provide further embodiments of this aspect.

In a second aspect of the invention, there is provided the use of an oil dispersant composition as defined in the first aspect of the invention and any technically sensible combination of its embodiments as an oil spill dispersant.

In a third aspect of the invention, there is provided a method of dispersing an oil spill, which involves the step of contacting an oil in a body of water with a surfactant composition as defined in the first aspect of the invention and any technically sensible combination of its embodiments.

In embodiments of the third aspect of the invention:

(a) the oil dispersant composition may be applied to the oil in a volume:volume ratio of from 1:10 to 1:100, such as from 1:10 to 1:50, such as from 1:10 to 1:25;

(b) the effectiveness of the oil dispersant composition in dispersing the oil is from 45 to 100%, such as from 48 to 95%, such as from 50 to 93%, such as from 75 to 90%;

(c) the body of water has a salinity of from 0 to 5 wt %;

(d) the body of water comprises a bacterial population and contacting the body of water with the surfactant composition increases the population of bacteria in the body of water.

Further aspects and embodiments of the invention are described in the following clauses.

1. An oil dispersant composition, comprising:
   an acyl amino acid ionic liquid;
   a dicationic ionic liquid;
   a fruit acid ionic liquid;
   a polyacid ionic liquid; and
   an ethoxylate oleyl ether ionic liquid.
2. The composition according to Clause 1, wherein the composition further comprises water.
3. The composition according to Clause 1 or Clause 2, wherein the acyl amino acid ionic liquid consists of:
a cation selected from one or more of the group consisting of:

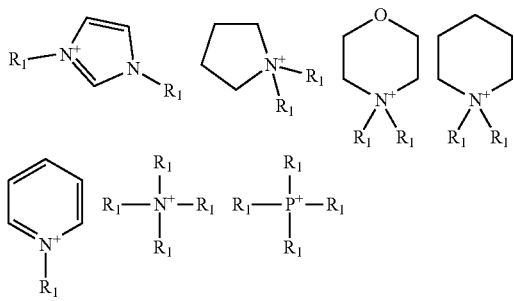

cholinium, and betaine, where each $R_1$ group is independently selected from $C_1$ to $C_4$ alkyl; and
an anion selected from one or more of the group consisting of lauroyl sarcosinate, oleoyl sarcosinate, lauroyl glutamate, oleoyl glutamate, lauroyl isethionate, and oleoyl isethionate.
4. The composition according to any one of the preceding clauses, wherein the dicationic ionic liquid has the formula I:

$$[[Cat]\text{-}L\text{-}[Cat]]^{2+}\cdot 2Y^- \quad\quad I,$$

where each [Cat] group is independently a cationic group selected from:

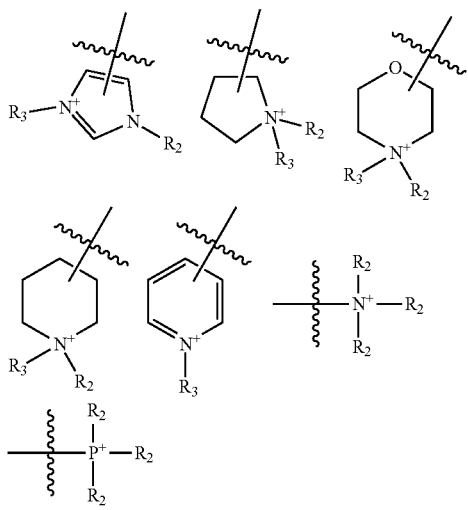

cholinium, and betaine, where:
each $R_2$ group independently represents H, or $C_1$ to $C_4$ alkyl;
each $R_3$ group independently represents $C_2$ to $C_6$ alkyl or the point of attachment of each [Cat] group to the rest of the molecule;

where the wavy line represents the point of attachment to the rest of the molecule, except in cases where the $R_3$ group represents the point of attachment to the rest of the molecule, in which case, the bond represented by the wavy line is absent;
each L independently represents a $C_2$ to $C_6$ alkylene;
each $Y^-$ is independently selected from the group consisting of a sulfonate (e.g. dodecyl benzene sulfonate and dihexylsulfosuccinate, dioctylsulfosuccinate), lauroyl sarcosinate, oleoyl sarcosinate, lauroyl glutamate, oleoyl glutamate, lauroyl isethionate, oleoyl isethionate, and a fatty acid anion (e.g. a $C_{10}$ to $C_{22}$, such as a $C_{12}$ to $C_{18}$, fatty acid anion, such as one or more of the group consisting of stearate, oleate, linoleate, palmitate, myristate, and laurate).
5. The composition according to any one of the preceding clauses, wherein the fruit acid ionic liquid consists of:
an anionic component selected from one or more of the group consisting of citrate, lactate, succinate, glycolate, malate, and tartrate, where all carboxylic acid groups are in an anionic form; and
a cationic component selected from one or more of the group consisting of:

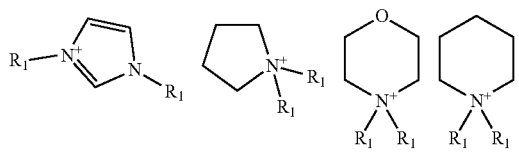

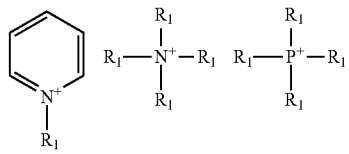

cholinium, and betaine, where each $R_1$ group is independently selected from $C_1$ to $C_4$ alkyl, and the number of cationic groups balances the number of anions in the anionic component.
6. The composition according to any one of the preceding clauses, wherein the polyacid ionic liquid consists of one or more polyphosphates in fully deprotonated form and cationic counterions selected from:

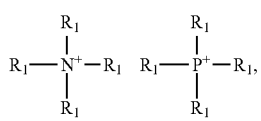

cholinium, and betaine, where each $R_1$ group is independently selected from $C_1$ to $C_4$ alkyl, and the number of cationic groups balances the number of anions in the one or more polyphosphates.
7. The composition according to any one of the preceding clauses, wherein the ethoxylate oleyl ether ionic liquid has the formula II:

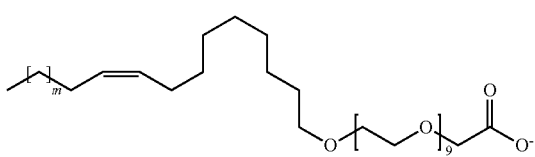

II where Y is selected from:

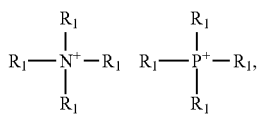

cholinium, and betaine, where each $R_1$ group is independently selected from $C_1$ to $C_4$ alkyl; and
m is 5 to 7.

8. The composition according to any one of the preceding clauses wherein the composition comprises:
   the acyl amino acid ionic liquid is present in an amount of from 10 to 20 wt %;
   the dicationic ionic liquid is present in an amount of from 5 to 30 wt %;
   the fruit acid ionic liquid is present in an amount of from 30 to 60%;
   the polyacid ionic liquid is present in an amount of from 10 to 20 wt %; and
   the ethoxylate oleyl ether ionic liquid is present in an amount of from 5 to 15 wt %.

9. The composition according to Clause 8 wherein the composition comprises:
   the acyl amino acid ionic liquid is present in an amount of from 12.5 to 17.4 wt %;
   the dicationic ionic liquid is present in an amount of from 8.33 to 24.6 wt %;
   the fruit acid ionic liquid is present in an amount of from 35.8 to 50%;
   the polyacid ionic liquid is present in an amount of from 11.6 to 16.67 wt %; and
   the ethoxylate oleyl ether ionic liquid is present in an amount of from 10.6 to 12.5 wt %.

10. The composition according to any one of Clauses 2 to 7, wherein:
   the acyl amino acid ionic liquid is present in an amount of from 2 to 15 wt %;
   the dicationic ionic liquid is present in an amount of from 1 to 20 wt %;
   the fruit acid ionic liquid is present in an amount of from 10 to 25%;
   the polyacid ionic liquid is present in an amount of from 2 to 10 wt %;
   the ethoxylate oleyl ether ionic liquid is present in an amount of from 2 to 10 wt %; and
   water to make 100 wt %.

11. The composition according to Clause 10, wherein:
   the acyl amino acid ionic liquid is present in an amount of from 3 to 9 wt %;
   the dicationic ionic liquid is present in an amount of from 2 to 12.7 wt %;
   the fruit acid ionic liquid is present in an amount of from 12 to 18.5%;
   the polyacid ionic liquid is present in an amount of from 4 to 6 wt %;
   the ethoxylate oleyl ether ionic liquid is present in an amount of from 3 to 5.5 wt %; and
   water to make 100 wt %.

12. The composition according to any one of the preceding clauses, wherein the acyl amino acid ionic liquid is 1-butyl-3-methylimidazolium lauroylsarcosinate.

13. The composition according to any one of the preceding clauses, wherein the dicationic ionic liquid is a N-alkyl-N-methyl pyrrolidinium dodecyl benzenesulfonate of formula III:

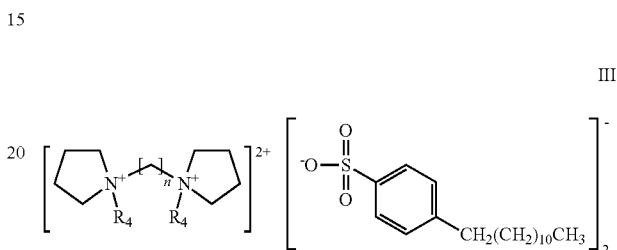

III where:
each $R_4$ independently represents H, or $C_1$ to $C_4$ alkyl; and
n represents a number from 2 to 6.

14. The composition according to any one of the preceding clauses, wherein the fruit acid ionic liquid is a tetraalkylammonium citrate, such as tetrabutylammonium citrate.

15. The composition according to any one of the preceding clauses, wherein the polyacid ionic liquid is a tetraalkylammonium polyphosphate, such as tetrabutylammonium polyphosphate.

16. The composition according to any one of the preceding clauses, wherein the ethoxylate oleyl ether ionic liquid has the formula II:

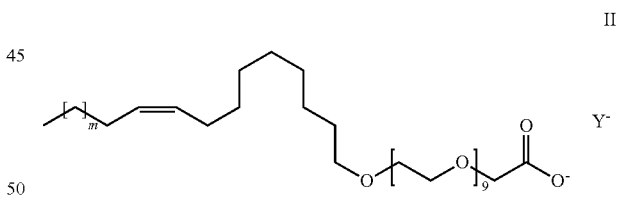

II where Y is a tetralkylammonium, such as tetrabutylammonium; and
m is 5 or 6.

17. The composition according to any one of the preceding clauses, wherein:
   the acyl amino acid ionic liquid is 1-butyl-3-methylimidazolium lauroylsarcosinate;
   the dicationic ionic liquid is a N-alkyl-N-methyl pyrrolidinium dodecyl benzenesulfonate as defined in Clause 13;
   the fruit acid ionic liquid is tetrabutylammonium citrate;
   the polyacid ionic liquid is tetrabutylammonium polyphosphate; and the ethoxylate oleyl ether ionic liquid has the formula II:

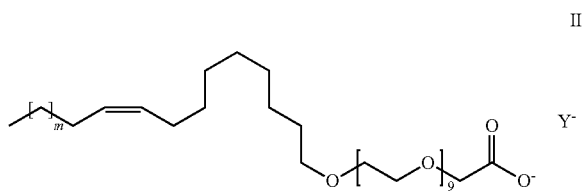

where Y is tetrabutylammonium and m is 6.

18. Use of an oil dispersant composition as defined in any one of Clauses 1 to 17 as an oil spill dispersant.

19. A method of dispersing an oil spill, which involves the step of contacting an oil in a body of water with an oil dispersant composition as defined in any one of Clauses 1 to 17.

20. The method according to Clause 19, wherein the oil dispersant composition is applied to the oil in a volume:volume ratio of from 1:10 to 1:100, such as from 1:10 to 1:50, such as from 1:10 to 1:25.

21. The method according to Clause 19 or Clause 20, wherein the effectiveness of the oil dispersant composition in dispersing the oil is from 45 to 100%, such as from 48 to 95%, such as from 50 to 93%, such as from 75 to 90%.

22. The method according to any one of Clauses 19 to 21, wherein the body of water has a salinity of from 0 to 5 wt %.

23. The method according to any one of Clauses 19 to 21, wherein the body of water comprises a bacterial population and contacting the body of water with the oil dispersant composition increases the population of bacteria in the body of water.

DRAWINGS

DESCRIPTION

Figure 1:
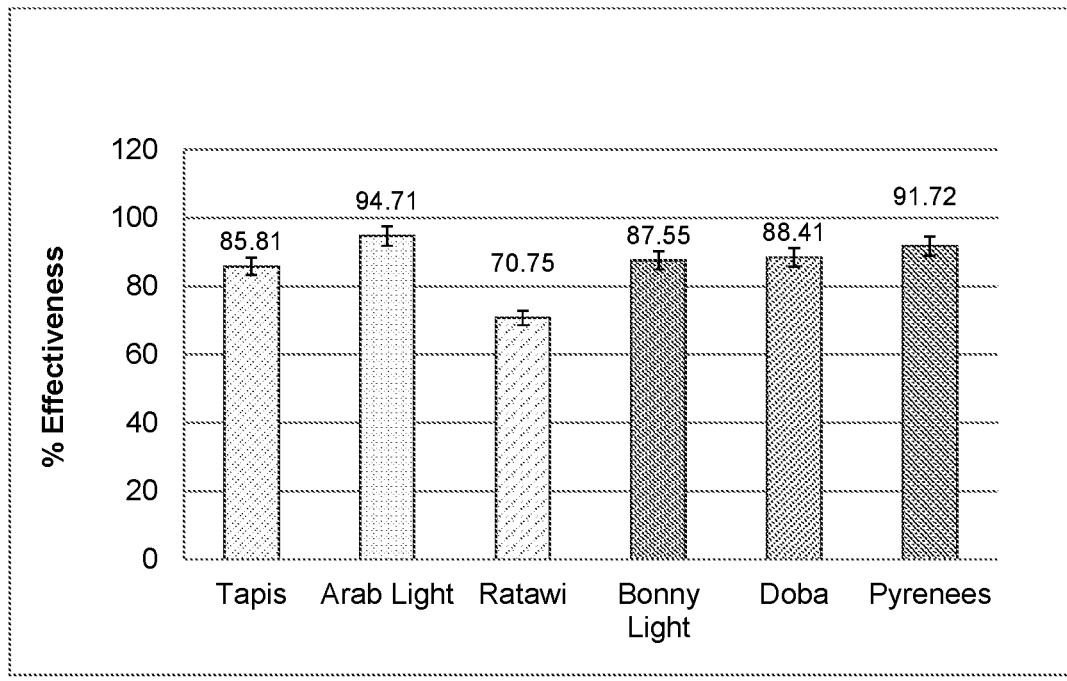
FIG. 1 depicts a bar chart showing the dispersant effectiveness against various crude oil API.
Figure 2:
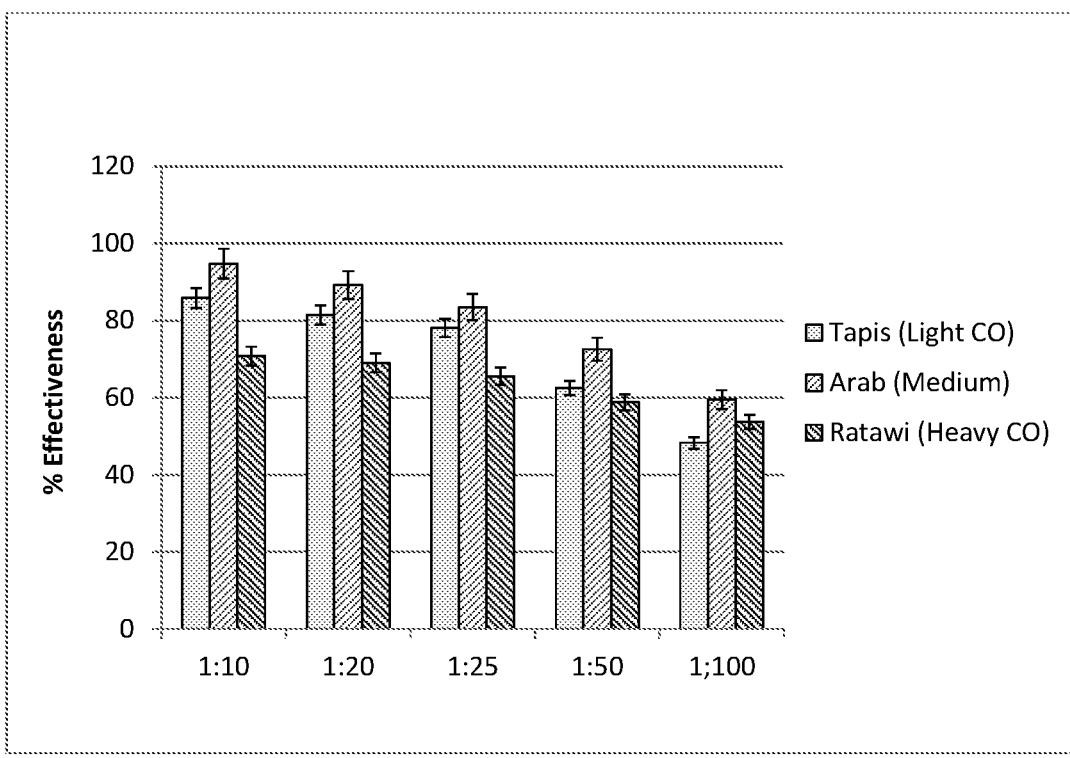
FIG. 2 depicts a bar chart showing the dispersant effectiveness against different Dispersant to Oil Ratio (DOR).
Figure 3:
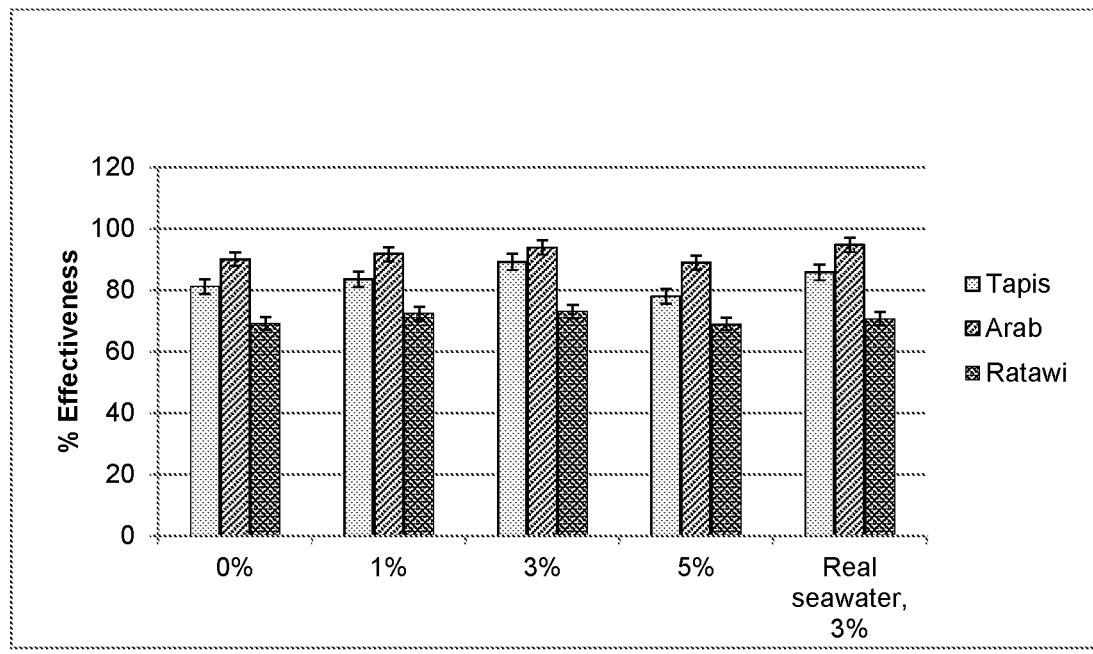
FIG. 3 depicts a bar chart showing the dispersant effectiveness against different salinity.
Figure 4:
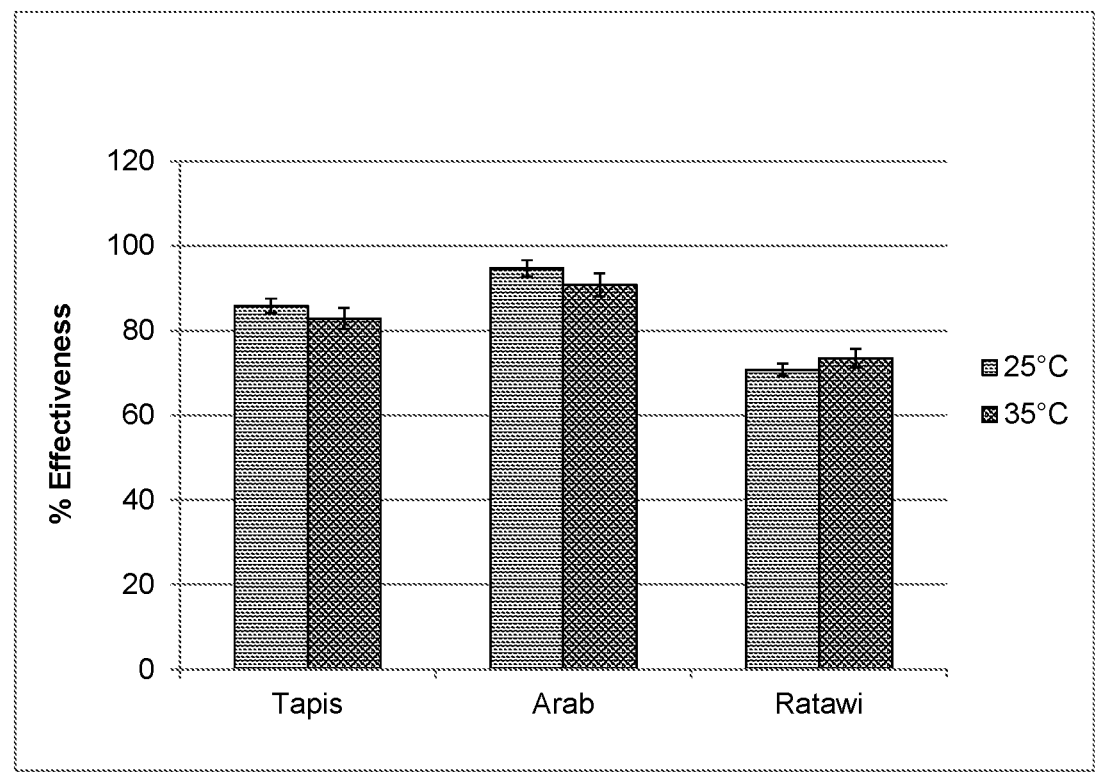
FIG. 4 depicts a bar chart showing the dispersant effectiveness at different temperatures.

Disclosed herein is an oil dispersant composition that overcomes some or all of the problems discussed above. That is, there is disclosed herein an oil dispersant composition, comprising: an acyl amino acid ionic liquid; a dicationic ionic liquid; a fruit acid ionic liquid; a polyacid ionic liquid; and an ethoxylate oleyl ether ionic liquid.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

When used herein, the term "oil" is intended to relate to any petroleum hydrocarbon that may, at times, be in need of dispersal in an aquatic environment. Examples of petroleum hydrocarbons that may be mentioned herein include, but are not limited to mineral oils, crude oil (light to heavy—API 10-45), heavy oil, residual fuels, diesel, kerosene, gasoline, white spirits, lubricants and the like. Particular petroleum hydrocarbons that may be mentioned herein include crude oil (light to heavy—API 10-45).

As noted above, the composition may be provided in the form that does not contain water. However, the formulation may in some cases contain water or be diluted with water before it is applied to an oil spill. As such, the composition may further comprise (or contain) water in any suitable amount, as further discussed herein below.

As noted above, the composition comprises at least five different ionic liquids. As will be appreciated, an ionic liquid is a salt that is liquid and comprises at least one cationic component and at least one anionic component. Unless otherwise stated herein, the ionic liquids used in the current invention may be liquid at room temperature, or may be liquid/dissolve when water is added to the composition.

When used herein, the term "acyl amino acid ionic liquid" refers to an ionic liquid that comprises an ammonium-containing organic molecule as the cation and a carboxylate or isethionate-containing organic molecule as the anion. Examples of acyl amino acid ionic liquids include those in which the anion may be selected from one or more of the group consisting of lauroyl sarcosinate, oleoyl sarcosinate, lauroyl glutamate, oleoyl glutamate, lauroyl isethionate, and oleoyl isethionate and the cation may be selected from one or more of the group consisting of:

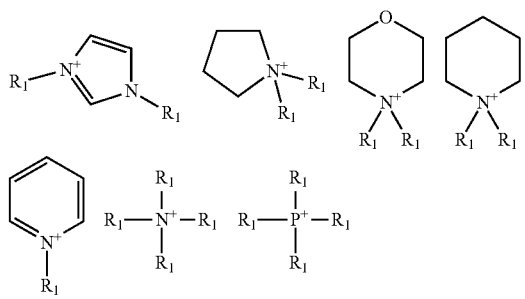

cholinium, and betaine, where each $R_1$ group is independently selected from $C_1$ to $C_4$ alkyl. As will be clear any combination of anions and cations described above is envisaged herein, this may include one or more (e.g. 1, 2, 3, 4, or 5) cations and/or anions selected from the above-mentioned groups. In embodiments of the invention that may be mentioned herein, the acyl amino acid ionic liquid may be 1-butyl-3-methylimidazolium lauroylsarcosinate.

Any suitable amount of the acyl amino acid ionic liquid may be present in the compositions disclosed herein. For example, the compositions may contain from 10 to 20 wt % or from 12.5 to 17.4 wt % of the acyl amino acid ionic liquid when the compositions do not contain water, or the compositions may contain from 2 to 15 wt %, such as from 3 to 9 wt % of the acyl amino acid ionic liquid when the composition further contains water.

Unless otherwise stated herein, when a numerical range is provided, the top and bottom values cited may be combined with the top and bottom values of any other numerical range quoted in relation to the same component(s). For example, for the ranges provided above for the acyl amino acid ionic liquid in compositions that also comprise water, the following ranges are also present: from 2 to 3 wt %, from 2 to 9 wt %, from 3 to 25 wt % and from 9 to 15 wt %.

When used herein, the term "dicationic ionic liquid" refers to an ionic liquid that comprises an organic molecule that comprises two cationic groups balanced by the presence of two anionic organic molecules. For example, the dicationic ionic liquid may have the formula I:

$$[[Cat]\text{-}L\text{-}[Cat]]^{2+}\cdot 2Y^{-} \qquad I,$$

where each [Cat] group may be a cationic group independently selected from:

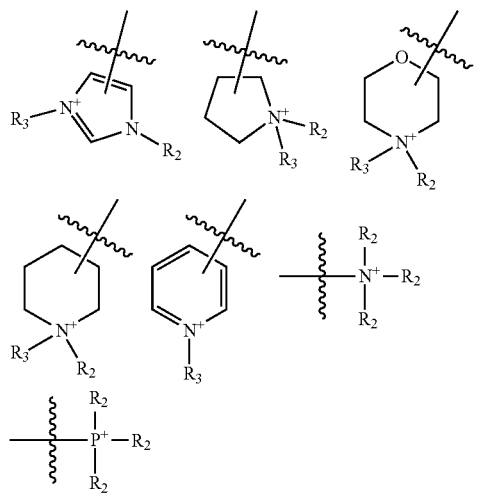

cholinium, and betaine, where:
each $R_2$ group independently represents H, or $C_1$ to $C_4$ alkyl;
each $R_3$ group independently represents $C_2$ to $C_6$ alkyl or the point of attachment of each [Cat] group to the rest of the molecule;
where the wavy line represents the point of attachment to the rest of the molecule, except in cases where the $R_3$ group represents the point of attachment to the rest of the molecule, in which case, the bond represented by the wavy line is absent;
each L independently represents a $C_2$ to $C_6$ (e.g., $C_3$ to $C_5$ alkylene;
each $Y^-$ is independently selected from the group consisting of a sulfonate (e.g. dodecyl benzene sulfonate and dihexylsulfosuccinate, dioctylsulfosuccinate), lauroyl sarcosinate, oleoyl sarcosinate, lauroyl glutamate, oleoyl glutamate, lauroyl isethionate, oleoyl isethionate, and a fatty acid anion (e.g. a $C_{10}$ to $C_{22}$, such as a $C_{12}$ to $C_{18}$, fatty acid anion, such as one or more of the group consisting of stearate, oleate, linoleate, palmitate, myristate, and laurate).

As noted above, certain of the possible cationic ([Cat]) groups listed in connection with formula I of the dicationic ionic liquid contains a straight line with a wavy line through it. This is intended to refer to an undefined point of attachment to the rest of the molecule in the situation where $R_3$ is not the point of attachment to the rest of the molecule. For example, for the moiety:

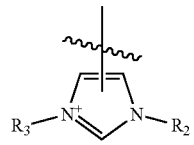

the following points of attachment are envisaged when $R_3$ is not the point of attachment:

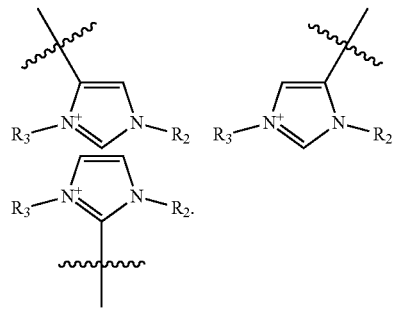

Analagous points of attachment may be derived for each of the moieties recited above based upon the common knowledge of the person skilled in the art.

For the avoidance of doubt, in the situation where $R_3$ represents the point of attachment to the rest of the molecule, the bond with the wavy line through it is absent. For example:

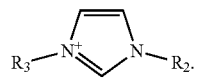

When used herein, the word "independently" is used to make clear that where there is more than one of a particular group (e.g. the [Cat] groups), each group in question may be the same or different. However, in particular embodiments herein, it may be preferred that all of these independent groups are identical to one another. For example, in embodiments using the compound of formula I, the each [Cat] group may be:

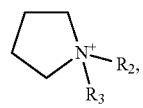

where $R^3$ represents the point of attachment to the rest of the molecule (i.e. a bond to the "L" group) and each $R^2$ represents H.

As will be clear any combination of anions and cations described above is envisaged herein, this may include one or more (e.g. 1, 2, 3, 4, or 5) cationic and/or anionic molecules selected from the above-mentioned groups. In embodiments of the invention that may be mentioned herein, the dicationic ionic liquid may be a N-alkyl-N-methyl pyrrolidinium dodecyl benzenesulfonate of formula III:

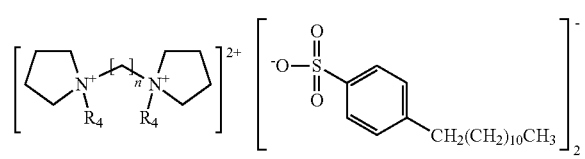

where:
each $R_4$ independently represents H, or $C_1$ to $C_4$ alkyl; and
n represents a number from 2 to 6.

In further embodiments of the invention that may be mentioned herein, the dicationic ionic liquid may be a N-alkyl-N-methyl pyrrolidinium dodecyl benzenesulfonate of formula III, where $R_4$ is H; and n is 4. In other words, the dicationic ionic liquid may have the following structure:

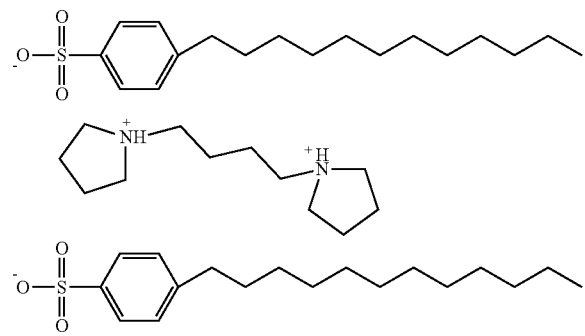

Any suitable amount of the dicationic ionic liquid may be present in the compositions disclosed herein. For example, the compositions may contain from 5 to 30 wt % or from 8.33 to 24.6 wt % of the dicationic ionic liquid when the compositions do not contain water, or the compositions may contain from 1 to 20 wt %, such as from 2 to 12.7 wt % of the dicationic ionic liquid when the composition further contains water.

When used herein, the term "fruit acid ionic liquid" refers to an ionic liquid that comprises an organic molecule that comprises an anionic organic molecule that is the fully anionic form of a fruit acid and a number of cationic organic molecules to balance the charge of a fully anionic fruit acid. When used herein, the term "fully anionic form of a fruit acid" refers to the carboxylic acid groups of the fruit acid being in the anionic form (a fruit acid may have from one to three carboxylate groups). For example, the fruit acid ionic liquid may have an anionic component selected from one or more of the group consisting of citrate, lactate, succinate, glycolate, malate, and tartrate, where all carboxylic acid groups are in an anionic form; and a cationic component selected from one or more of the group consisting of:

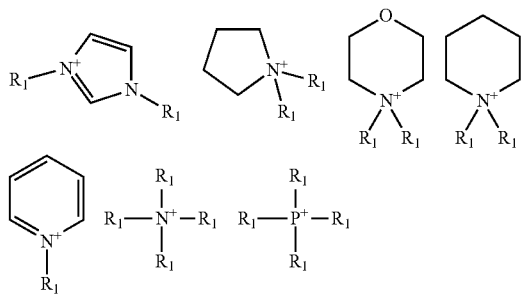

cholinium, and betaine, where each $R_1$ group is independently selected from $C_1$ to $C_4$ alkyl, and the number of cationic groups balances the number of anions in the anionic component.

As will be clear any combination of anions and cations described above is envisaged herein, this may include one or more (e.g. 1, 2, 3, 4, or 5) cationic and/or anionic molecules selected from the above-mentioned groups. In embodiments that may be mentioned herein, the fruit acid ionic liquid may a tetraalkylammonium citrate, such as tetrabutylammonium citrate.

Any suitable amount of the fruit acid ionic liquid may be present in the compositions disclosed herein. For example, the compositions may contain from 30 to 60 wt % or from 35.8 to 50 wt % of the fruit acid ionic liquid when the compositions do not contain water, or the compositions may contain from 10 wt % to 25 wt %, such as from 12 to 18.5 wt % of the fruit acid ionic liquid when the composition further contains water.

When used herein, the term "polyacid ionic liquid" refers to an ionic liquid that comprises one or more polyphosphate compounds in fully deprotonated form and cationic organic molecules that balance the number of anionic groups in the polyphoshpate(s). For example, the polyacid ionic liquid may have one or more polyphosphates in fully deprotonated form and cationic counterions selected from:

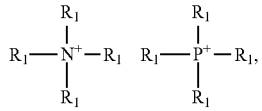

cholinium, and betaine, where each $R_1$ group is independently selected from $C_1$ to $C_4$ alkyl, and the number of cationic groups balances the number of anions in the one or more polyphosphates. Polyphosphates are polymeric oxyanions formed from tetrahedral $PO_4$ (phosphate) structural units linked together by shared oxygen atoms. Examples of polyphosphates include, but are not limited to triphosphoric acid, polyphosphoric acid, and cyclic trimetaphosphate. As will be clear any combination of anions and cations described above is envisaged herein, this may include one or more (e.g. 1, 2, 3, 4, or 5) cationic and/or anionic molecules selected from the above-mentioned groups. In embodiments that may be mentioned herein, the polyacid ionic liquid may be a tetraalkylammonium polyphosphate, such as tetrabutylammonium polyphosphate.

Any suitable amount of the polyacid ionic liquid may be present in the compositions disclosed herein. For example, the compositions may contain from 10 to 20 wt % or from 11.6 to 16.67 wt % of the polyacid ionic liquid when the compositions do not contain water, or the compositions may contain from 2 wt % to 10 wt %, such as from 4 to 6 wt % of the polyacid ionic liquid when the composition further contains water.

When used herein, the ethoxylate oleyl ether ionic liquid contains an ethoxylate oleyl ether in anionic form and an cationic organic molecule as a counter ion. For example, the ethoxylate oleyl ether ionic liquid may have the formula II:

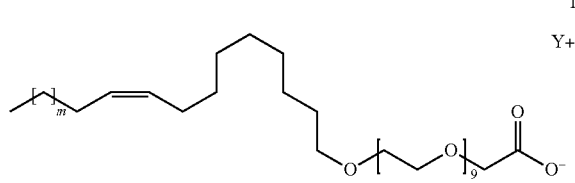

where Y is selected from:

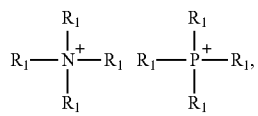

cholinium, and betaine, where each $R_1$ group is independently selected from $C_1$ to $C_4$ alkyl. In embodiments that may be mentioned herein, the cation of the ethoxylate oleyl ether ionic liquid may be a tetraalkylammonium ion, such as tetrabutylammonium ion; and
m is from 5 to 7.

Any suitable amount of the ethoxylate oleyl ether ionic liquid may be present in the compositions disclosed herein. For example, the compositions may contain from 5 to 15 wt % or from 10.6 to 12.5 wt % of the ethoxylate oleyl ether ionic liquid when the compositions do not contain water, or the compositions may contain from 2 wt % to 10 wt %, such as from 3 to 5.55 wt % of the polyacid ionic liquid when the composition further contains water.

As noted above, the compositions disclosed herein may be provided in a form without water (i.e. the composition is substantially free of water, such that is contains less than 1 wt % water) or in a form where water is present (i.e. in an amount of from 15 to 85 wt % water).

In particular embodiments that may be mentioned herein where water is not present (or is substantially absent) from the composition, the composition may contain the acyl amino acid ionic liquid is present in an amount of from 10 to 20 wt %; the dicationic ionic liquid is present in an amount of from 5 to 30 wt %; the fruit acid ionic liquid is present in an amount of from 30 to 60%; the polyacid ionic liquid is present in an amount of from 10 to 20 wt %; and the ethoxylate oleyl ether ionic liquid is present in an amount of from 5 to 15 wt %. Yet more particularly, the composition may contain: the acyl amino acid ionic liquid is present in an amount of from 12.5 to 17.4 wt %; the dicationic ionic liquid is present in an amount of from 8.33 to 24.6 wt %; the fruit acid ionic liquid is present in an amount of from 35.8 to 50%; the polyacid ionic liquid is present in an amount of from 11.6 to 16.67 wt %; and the ethoxylate oleyl ether ionic liquid is present in an amount of from 10.6 to 12.5 wt %.

In embodiments where the composition comprises water, the composition may contain: the acyl amino acid ionic liquid is present in an amount of from 2 to 15 wt %; the dicationic ionic liquid is present in an amount of from 1 to 20 wt %; the fruit acid ionic liquid is present in an amount of from 10 to 25%; the polyacid ionic liquid is present in an amount of from 2 to 10 wt %; the ethoxylate oleyl ether ionic liquid is present in an amount of from 2 to 10 wt %; and water to make 100 wt %. Yet more particularly, the composition may contain: the acyl amino acid ionic liquid is present in an amount of from 3 to 9 wt %; the dicationic ionic liquid is present in an amount of from 2 to 12.7 wt %; the fruit acid ionic liquid is present in an amount of from 12 to 18.5%; the polyacid ionic liquid is present in an amount of from 4 to 6 wt %; the ethoxylate oleyl ether ionic liquid is present in an amount of from 3 to 5.5 wt %; and water to make 100 wt %.

In particular embodiments of the invention (whether in the presence or absence of water), the composition may be one in which: the acyl amino acid ionic liquid is 1-butyl-3-methylimidazolium lauroylsarcosinate; the dicationic ionic liquid is a N-alkyl-N-methyl pyrrolidinium dodecyl benzenesulfonate as defined in formula III above; the fruit acid ionic liquid is tetrabutylammonium citrate; the polyacid ionic liquid is tetrabutylammonium polyphosphate; and the ethoxylate oleyl ether ionic liquid has the formula II:

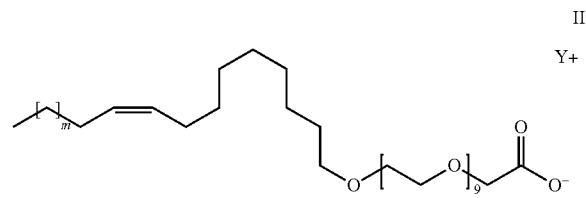

where Y is tetrabutylammonium; and
m is 6.

As will be appreciated, the oil dispersant composition described above may be used as an oil spill dispersant. For the avoidance of doubt, an "oil spill" refers to the presence of one or more petroleum hydrocarbons on the surface of a body of water.

Given the above potential use, there is also disclosed a method of using the oil dispersant composition to remove an oil spill. Thus, there is also disclosed a method of dispersing an oil spill, which involves the step of contacting an oil in a body of water with an oil dispersant composition as defined hereinbefore.

In the method above, any suitable amount of the oil dispersant composition may be used. For example, the oil dispersant composition may be applied to the oil involved in the oil spill in a volume:volume ratio of from 1:10 to 1:100, such as from 1:10 to 1:50, such as from 1:10 to 1:25. As will be appreciated, this will involve estimating the amount of oil involved in the oil spill. Such estimates may be obtained by the amount of leakage recorded by a system that monitors the amount of oil in a container from which the leak has occurred or by calculation (a non-limiting example of how such a calculation mach be conducted is provided by http://www.responseqroupinc.com/Products/spill-volume-calculator).

The effectiveness of the oil dispersant composition in dispersing the oil is from 45 to 100%, such as from 48 to 95%, such as from 50 to 93%, such as from 75 to 90%. The effectiveness may be calculated as described in the examples section below.

The water body to be treated may be fresh water (i.e. little or no salinity) or it may be sea or brackish water. As such, the water to be treated by have a salinity of from 0 to 5 wt %. The salinity of the water may be measured, for example, by a salinity refractometer.

The composition described herein may be less toxic than those currently used. For example, in an eco-toxicity study performed using an oil dispersant composition according to the currently claimed invention, the $LC_{50}$ value against *Epinephelus* sp. for said composition in a 96 hour test was from 100 to 1000 mg/L, which is considered to be practically non-toxic. In comparison, a commercial oil dispersant has a toxicity value of from 10-100 mg/L, meaning that it is slightly toxic to said species.

In addition, each of the ionic liquid components described herein are practically non-toxic in an acute fish toxicity, OECD 203/206 test (each component has an $LC_{50}$ of greater than 100 ppm) and each component is readily biodegradeable, as the each component exceeded 60% in relation to the theoretical oxygen demand (ThOD) within 28 days, in accordance with the OECD method for defining biodegradeability.

In addition, when the body of water comprises a bacterial population, contacting the body of water with the oil dispersant composition described herein may increase the population of bacteria in the body of water. This may help to stimulate the bacterial population in a way that may assist with the degradation of the hydrocarbons in the oil spill.

As described in more detail below in the examples section, the addition of an oil dispersant composition in accordance with the invention disclosed herein boosted the growth of both Gram negative and Gram positive bacteria in a sample of sea water over a period of 24 hours. Bacteria that may benefit from the inclusion of the compositions described herein include, but are not limited to *Escherichia coli* (*E. coli*), *Listeria monocytogenes* (*L. monocytogenes*) and the like—even when the composition was present at a concentration of only 100 ppm. Said boost in growth may be from 1 to 100%, such as from 5 to 75%, from 10 to 25% (as measured using optical density) over a period of from 25 to 50 hours. The above growth boost occurs in samples of water that have not yet been affected by oil and so it may be useful to treat an area that may be affected by the oil spill with the oil dispersant composition ahead of the oil spill reaching the area, as boosting the bacteria flora and fauna may be useful in degrading the oil.

In addition, where the oil dispersant is added to a water contaminated with an oil, the growth in the bacterial species can be boosted significantly, as compared to the bacterial growth in a water sample that is only contaminated with the oil in question. For example, *E. coli* may grow at a 20% faster rate in the presence of oil and an oil dispersant composition according to the current invention, while *L. monocytogenes* may grow at a 70% faster rate and the microorganisms in seawater may grow at a 40% faster rate. Thus, the presence of the compositions described herein in the water may act as a nutrient for and stimulate the growth of bacteria present in the water to be treated and this bacteria may also contribute to the dispersal of the oil.

Further details of the invention will now be described with reference to the following non-limiting examples.

EXAMPLES

Materials and Methods

All chemicals were supplied by Sigma Aldrich and were used as received without any further purification.

General Procedure 1: Preparation of Fatty Amino Acid Ionic Liquids

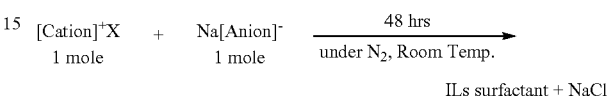

| Cation: | X⁻: Halide |
|---|---|
| R- pyrrolidinium | Chloride |
| R- morpholinium | Bromide |
| R- imidazolium | |
| R- piperidinium | |
| R- pyridium | Anion: |
| R- ammonium | Lauroyl Sarcosinate |
| R- phosphonium | Lauroyl Glutamate |
| Cholinium | Lauroyl Isethionate |
| Betanium | Oleoyl Sarcosinate |
| | Oleoyl Gluatamate |
| | Oleoyl Isethionate |

Fatty amino acid ionic liquids surfactants (or otherwise known as acyl amino acid ionic liquid surfactants) were prepared using a metathesis reaction as shown by the above reaction scheme. A halide cationic component ([Cation]⁺X) was mixed with a N-acyl amino sodium salt (Na[Anion]⁻) in a 1:1 molar ratio in the presence of ethanol (ethanol:reactant=2:1 (mass ratio) under an inert atmosphere of nitrogen. The mixture was stirred for 48 hours at room temperature. The resulting ionic liquid product was separated from sodium chloride by-product using filtration techniques. The remaining solvent was removed from the ionic liquid by vacuum evaporation using a rotary evaporator under reduced pressure at 100° C. for 5 hours. The final product was further dried under vacuum for 24 hours to remove the water content.

1-butyl-3-methylimidazolium lauroylsarcosinate 1-butyl-3-methylimidazolium lauroylsarcosinate was prepared following General procedure 1 above. 1-butyl-3-methylimidazolium halide salt [17.47 g, 0.1 mole] and lauroylsarcosinate sodium salt [29.34 g, 0.1 mole] were used as the halide cationic component and N-acyl amino sodium salt component, respectively.

1-butyl-3-methylimidazolium lauroylsarcosinate: Yielded ≥95% as yellowish semi-solid:

¹H NMR (500 MHz, MeOD) δ=0.881-0.908 (t, 3H, CH₃), 0.940-0.970 (t, 3H, CH₃), 1.107-1.1.35 (m, 2H, CH₂), 1.297-1.402 (m, 16H, CH₂), 1.544-1.582 (m, 2H, CH₂), 1.890-1.949 (m, 2H, CH₂), 2.232-2.235 (m, 2H, CH₂), 2.877-3.046 (d, 3H, CH₃), 3.679-3.796 (d, 2H, CH₂), 4.100 (s, 3H, CH₃), 4.442-4.456 (m, 2H, CH₂), 7.862-7.917 (d, 2H, CH) and 10.511 (s, 1H, CH).

General Procedure 2: Preparation of Dicationic Ionic Liquids

Dicationic ionic liquids were prepared by a two-step process.

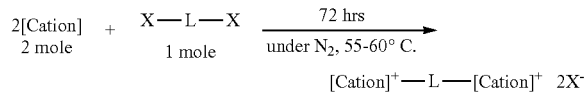

| Cation: | X: Anion |
|---|---|
| R- pyrrolidine | Chloride |
| R- morpholine | Bromide |
| R- imidazole | |
| R- piperidine | L: Spacer |
| R- pyridine | (C2 to C6 alkyl) |
| R- ammine | |
| R- phosphine | |

The first step involved dimerizing a cationic component with an organic/alkyl spacer ($C_2$-$C_6$).

The cationic component was mixed with an organic/alkyl spacer precursor in a 2:1 molar ratio under an inert atmosphere of nitrogen [solventless]. The mixture was stirred for 72 hours at 55 to 60° C. The dimerized product was obtained following vaporize to remove water, further purified using acetone.

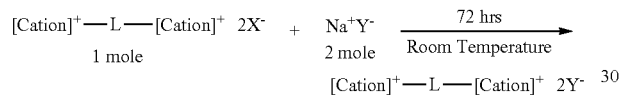

| Cation: | Y−: Anion |
|---|---|
| R- pyrrolidinium | Dodecylbenzenesulfonate |
| R- morpholinium | Dihexylsulfosuccinate |
| R- imidazolium | Dioctylsulfosuccinate |
| R- piperidinium | Lauroyl Sarcosinate |
| R- pyridium | Lauroyl Glutamate |
| R- ammonium | Lauroyl Isethionate |
| R- phosphonium | Oleoyl Sarcosinate |
| Cholinium | Oleoyl Gluatamate |
| Betanium | Oleoyl Isethionate |
| L: Spacer | Stearate |
| (C2 to C6 alkyl) | Oleate |
| | Linoleate |
| | Palmitate |
| | Myristate |
| | Laurate |

The dicationic product obtained from the first step was subsequently reacted with a N-acyl amino sodium salt in a 1:2 molar ratio in the presence of water as shown in the above scheme. The mixture was stirred for 72 hours at room temperature and thereafter vaporized to remove water, further purified using acetone.

1, 1'-(butane-1, 4-diyl)bis(1-H-pyrrolidinium) dodecyl benzenesulfonate

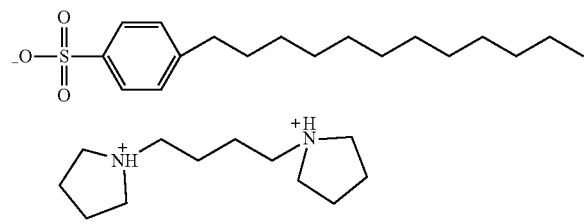

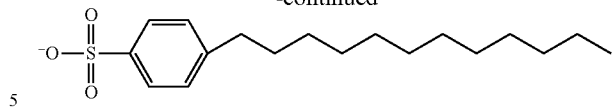

1, 1'-(butane-1, 4-diyl)bis(1-H-pyrrolidinium) dodecyl benzenesulfonate was prepared following general procedure 2. It was yielded ≥98% as yellowish semi-solid:

$^1$H NMR (500 MHz, $D_2O$) δ=0.450 (t, 3H, $CH_3$), 0.554-1.609 (m, 45H, $CH_2$, NH), 1.617-1.638 (m, 4H, $CH_2$), 1.811-1.848 (m, 8H, $CH_2$), 2.372-2.663 (m, 4H, $CH_2$), 3.079-3.107 (m, 4H, $CH_2$), 3.463-3.491 (m, 8H, $CH_2$), 6.975-7.573 (m, 8H, CH).

General Procedure 3: Preparation of Fruit Acid, Polyacid and Ethoxylate Oleyl Ether Ionic Liquids

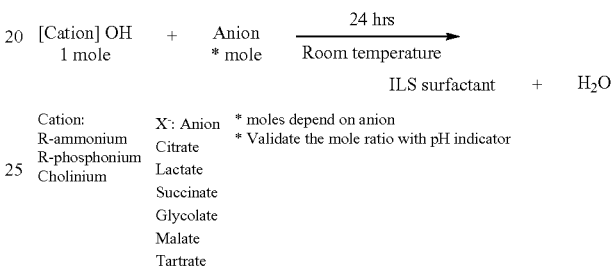

| Cation: | X: Anion | * moles depend on anion |
|---|---|---|
| R-ammonium | Citrate | * Validate the mole ratio with pH indicator |
| R-phosphonium | Lactate | |
| Cholinium | Succinate | |
| | Glycolate | |
| | Malate | |
| | Tartrate | |

Fruit acid ionic liquids were prepared by a neutralization reaction. A cationic component was mixed with a fruit acid anionic component, where the cationic component is used in an amount to balance the molar number of cationic and anionic groups in both components. This molar balance was validated with a pH indicator. The mixture was stirred for 24 hours at room temperature. After 24 hours the product was obtained without purification.

Polyacid ionic liquids were prepared by a similar procedure as above, but for replacing the fruit acid anionic component with a polyacid component (such as polyphosphoric acid).

Ethoxylate oleyl ether ionic liquids were prepared by a similar procedure as above, but for replacing the fruit acid anionic component with an ethoxylate oleyl ether component.

Tetrabutylammonium citrate (fruit acid ionic liquid) was prepared following General procedure 3 above. Tetrabutylammonium hydroxide and citric acid were used as the cationic component and fruit acid anionic component, respectively, in a 3:1 molar ratio. Tetrabutylammonium citrate: Yielded ≥98% as colorless liquid:

$^1$H NMR (500 MHz, $D_2O$) δ=0.646-0.803 (t, 36H, $CH_3$), 1.063-1.332 (m, 24H, $CH_2$), 1.456-1.519 (m, 24H, $CH_2$), 2.499-2.660 (m, 4H, $CH_2$), 2.906-3.159 (m, 24H, $CH_2$).

Tetrabutylammonium polyphosphate (polyacid ionic liquid) was also prepared following General procedure 3 above. Tetrabutylammonium hydroxide and polyphosphoric acid [115% $H_3PO_4$] were used as the cationic component and polyacid component, respectively, in a 3:1 molar ratio. Tetrabutylammonium polyphosphate: Yielded ≥98% as colorless liquid:

$^1$H NMR (500 MHz, $D_2O$) δ=0.769-0.799 (t, 36H, $CH_3$), 1.174-1.218 (m, 24H, $CH_2$), 1.468-1.499 (m, 24H, $CH_2$), 3.014-3.048 (m, 24H, $CH_2$).

Tetrabutylammonium ethoxy ether glycolate (ethoxylate oleyl ether ionic liquid) having a structure shown below was also prepared following General procedure 3 above. Tetrabutylammonium hydroxide [64.87 g] and a glycolic acid ethoxylate oleyl ether [90.15 g] were used as the cationic component and ethoxylate oleyl ether component, respectively, in a 1:1 molar ratio. Tetrabutylammonium ethoxylate oleyl ether glycolate: Yielded ≥98% as yellowish liquid:

$^1$H NMR (500 MHz, D$_2$O) δ=0.767 (t, 3H, CH$_3$), 0.806-0.836 (t, 12H, CH$_3$), 1.163-1.226 (m, 30H, CH$_2$), 1.505 (m, 2H, CH$_2$), 1.521-1.536 (t, 8H, CH$_2$), 1.892-1.904 (m, 4H, CH$_2$), 3.053-3.087 (m, 8H, CH$_2$), 3.325 (m, 2H, CH$_2$), 3.453-3.572 (m, 36H, CH$_3$), 3.841-3.847 (m, 2H, CH$_3$), 5.199-5.210 (t, 2H, CH$_2$).

Example 1: Preparation of Ionic Liquid Dispersant Formulation

The ionic liquid dispersant formulation (IL formulation) was prepared by mixing together the components listed in Table 1. No specific sequence of addition is required.

| Ionic liquid type | Ionic liquids | Percentage by weight (%) |
|---|---|---|
| Fatty amino acids | 1-butyl-3-methylimidazolium lauroylsarcosinate | 8.20 |
| Dicationic | 1,1'-(butane-1,4-diyl)bis(1-H-pyrrolidinium) dodecyl benzenesulfonate | 9.10 |
| Fruit acid | Tetrabutylammonium citrate | 14.50 |
| Poly acid | Tetrabutylammonium polyphosphate | 5.50 |
| Ethoxylate oleyl ether | Tetrabutylammonium ethoxy ether glycolate | 3.60 |

Water to make 100% by weight (around 60%)

It will be appreciated that any suitable ionic liquid may be used in the formulation, provided it belongs to one of the five ionic liquid types. In particular, suitable ionic liquids are those having cationic and/or anionic components that are mentioned explicitly or listed in the reaction schemes above.

The amounts of each ionic liquid type may be varied as follows.
- 3.0-9.0% by weight of fatty amino acids/acyl amino acid Ionic Liquids surfactant.
- 2.0-12.7% by weight of dicationic ionic liquids surfactant.
- 12.0-18.5% by weight fruit acid Ionic Liquids Surfactant.
- 4.0-6.0% by weight of poly acid Ionic Liquids surfactant.
- 3.0-5.5% by weight of ethoxylate oleyl ether Ionic Liquids surfactant.
- Water to make 100% by weight.

It will also be appreciated that the amount of water in the ionic liquid formulation may vary or may be absent entirely when the formulation is intended to be used in the undiluted or neat form. For example, the amount of water in the formulation may vary depending on the desired dispersant to oil ratio (DOR). At higher DOR, the final formulation may include lower amounts of water.

Example 2: Dispersant Effectiveness and Biodegradability (or Toxicity)

A modified Baffled Flask Test, based on the protocol established by the US Environmental Protection Agency, was conducted to evaluate the dispersant effectiveness.

Method

A volume 120 mL of seawater having a salinity of 3% (3 wt. % brine solution) was added to a baffled flask. To the flask was added a volume of IL formulation (dispersant) and a volume of crude oil at a specific dispersant to oil ratio (DOR). The mixture was stirred for 10 minutes at 200 rpm, and allowed to settle for 10 minutes. The experiments were carried out at 25° C. and 35° C. and was kept at (25±1° C.) and 35° C. respectively, unless provided otherwise. 30 mL of the dispersed sample was withdrawn and extracted with dichloromethane. The extracted samples were then analyzed with an UV-Vis spectrometer to determine the amount of dispersed oil.

The dispersant effectiveness was calculated by the following equation:

$$\% \text{ Dispersant effectiveness} = \frac{\text{Amount of oil dispersed}}{\text{Total oil loading}} \times 100\%$$

Most countries require a dispersant to meet a minimum percentage of effectiveness. For the UK and France, this is more than 60%. For Australia, this is more than 50%. For the USA, this is at least 45%.

Three types (light, medium, heavy) of crude oils are tested. They are Tapis, Bonny (light, API: 45.5), Arab, Ratawi (medium, API: 24.5), and Doba, Pyreness (heavy, API: 19.3).

Effect of Dispersant to Oil Ratio (DOR)

The test was conducted with varying DORs, starting from 1:100, 1:50, 1:25, 1:20 to 1:10.

It was found that the ionic liquid dispersant formulation (IL formulation) is effective at DORs from 1:10 up to 1:25 for all three crude oil types (light, medium and heavy) tested. At 1:100 DOR, the dispersant effectiveness was 48%. At 1:10 DOR, the dispersant effectiveness was 93%.

Effect of Salinity

The test was conducted with fresh water (0% salinity), and seawater having 1 to 5% salinity (1 to 5% brine). It was found that the IL formulation maintained a high dispersant effectiveness of 69% even at 5% salinity. In fresh water, the dispersant effectiveness was 90%* (treated with Arab CO).

*This may vary subjected to types of crude oil treated. (Please see the table below)

| Salinity, wt. % | Tapis | Arab | Ratawi |
|---|---|---|---|
| 0% | 81.13 | 90.06 | 69.15 |
| 1% | 83.57 | 91.75 | 72.41 |
| 3% | 89.25 | 93.88 | 73.05 |
| 5% | 78.05 | 88.94 | 69.06 |
| Real seawater, 3% | 85.81 | 94.71 | 70.75 |

Effect of Temperature

The test was conducted with varying temperature from 25 to 35° C. It was found that the IL formulation maintained a high dispersant effectiveness of 69% when the temperature was 35° C.

In conclusion, the IL formulation appears to meet the minimum effectiveness required by the UK, USA, France, and Australia, at a wide range of operating conditions.

Toxicity and Biodegradability

The components as used in the IL formulation are tested for toxicity on fish based on the OECD 203/206 test. Zebra fish and grouper fish were used.

All five ionic liquid types showed an acute fish toxicity (96 hours $LC_{50}$) of more than 100 ppm. This classifies the components as "practically nontoxic" under the acute toxicity rating scale by Fish and Wildlife Service.

The components are also tested for the extent of biodegradation. All five ionic liquid types exceeded 60% in relation to the theoretical oxygen demand (ThOD) within 28 days, so they were classified as readily biodegradable in accordance with the OECD method.

Example 3: Ionic Liquids as Nutrients for Microbial Growth

Tests were conducted to investigate whether the IL formulation can provide nutrients to simulate microbial growth, or in other words, provide a biostimulation effect.

Preparation of Ionic Liquids Sample

The titled sample was prepared starting from the IL formulation of Example 1. The IL formulation 100 mg was added to 1 Liter broth, filtered by a 0.22 µm filter and sterilized by autoclave, to provide a 100 ppm ionic liquid formulation sample.

Preparation of Microbe Culture

Luria Bertani (LB) broth was prepared by adding the following components: peptone, 0.2 g; yeast extract, 0.1 g; NaCl, 0.2 g; and deionized water, 1 L. The LB broth was autoclaved prior to culturing of microbe stock.

A culture of *Escherichia coli* (*E. coli*), *Listeria monocytogenes* (*L. monocytogenes*) and isolated sea water microbe (SW) was incubated at 37° C. and grown separately for 24 hours in LB broth. The sea water microbe was isolated from the fresh sea water obtain from Teluk Senangin, Perak. No single strain identification was done to identify particular bacterial strain. However, upon plating on agar, a typical sea water bacterial consortium was observed.

Incubation and Measurement 20 mL of LB broth containing 100 ppm ionic liquid sample (2 uL of ILs formulation was added to 20 mL of broth) was added to a conical flask. 200 µL of the sample was pipetted into a 96-well plate to provide a blank or a background reading. The conical flask was then added with 200 µL of microbe culture. The flask was incubated at 37° C. in an incubator shaker for 24 hours. After 24 hours, 200 µL of the incubated sample was pipetted into a 96-well plate. Bacterial growth was monitored by measuring turbidity at 620 nm using a microplate reader.

Results

Figure 5:
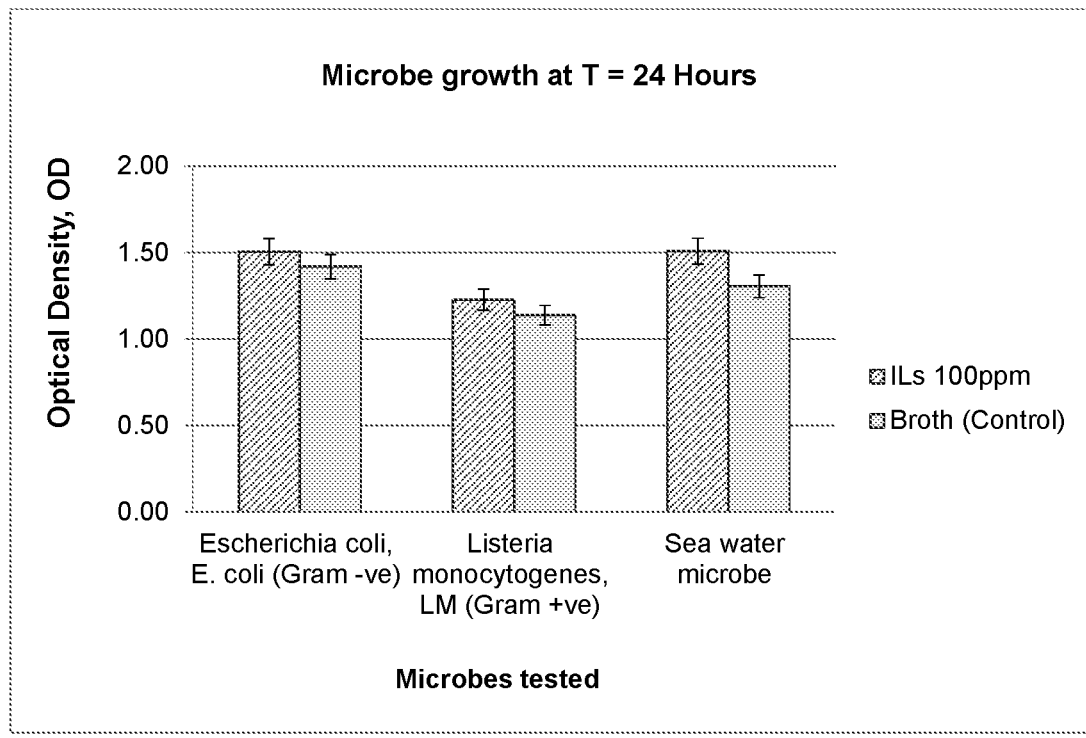
FIG. 5 depicts a graph showing growth of three microbial species in ionic liquid formulation versus broth (control).

FIG. 5 shows that the IL formulation boosted the growth of gram-negative and gram-positive bacteria (including the unknown sea water microbe) after 24 hours.

Figure 6:
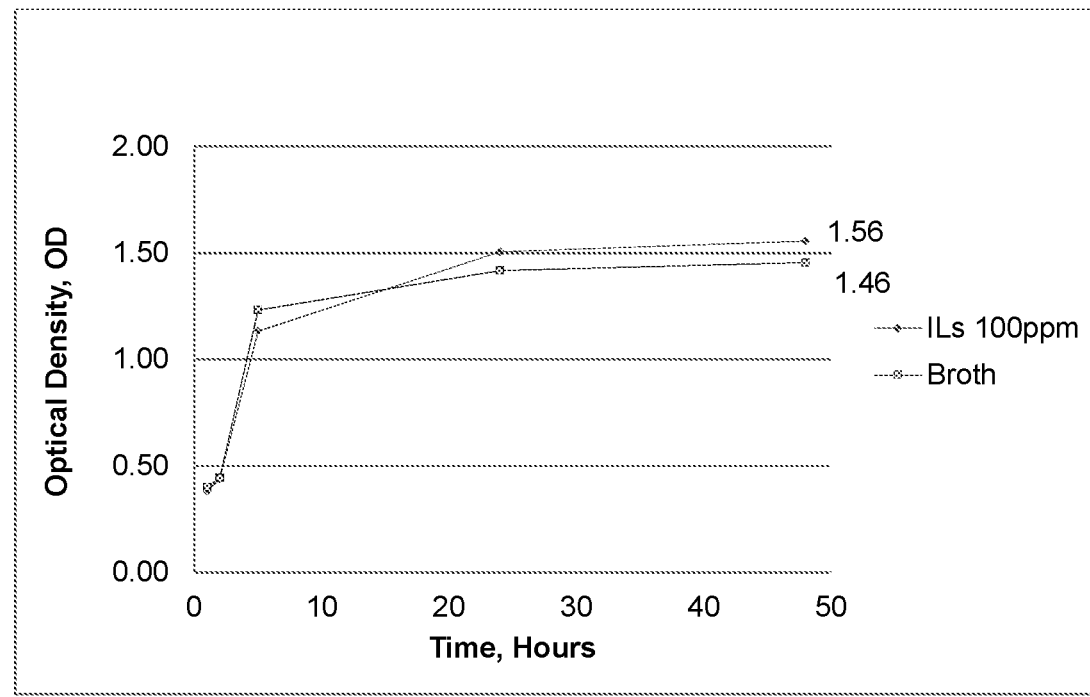
FIG. 6 depicts a graph showing growth of *Escherichia coli* over time.

FIG. 6 shows that after 48 hours, *E. coli* (gram-negative) growth was 10% higher in the medium supplemented with 100 ppm ionic liquids formulation as compared to the growth observed in broth medium without ionic liquids (control).

Figure 7:
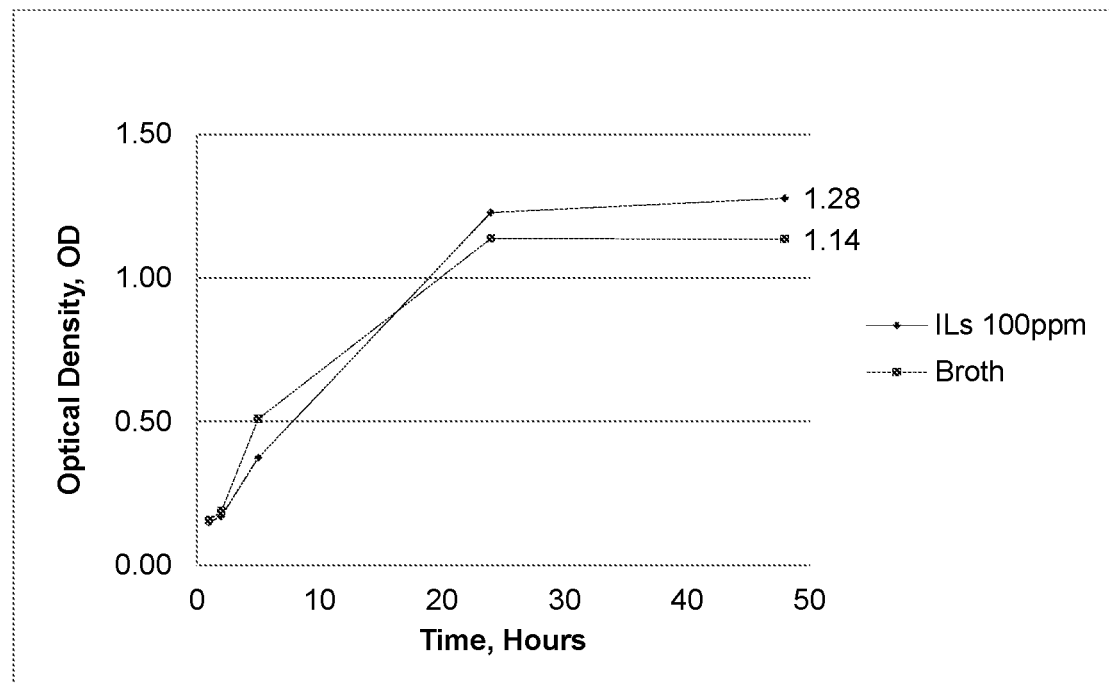
FIG. 7 depicts a graph showing growth of *Listeria monocytogenes* over time.

FIG. 7 shows that after 48 hours, *L. monocytogenes* (gram-positive) growth was almost 20% higher in medium supplemented with 100 ppm ionic liquids formulation as compared to the growth observed in broth medium without ionic liquids (control).

Figure 8:
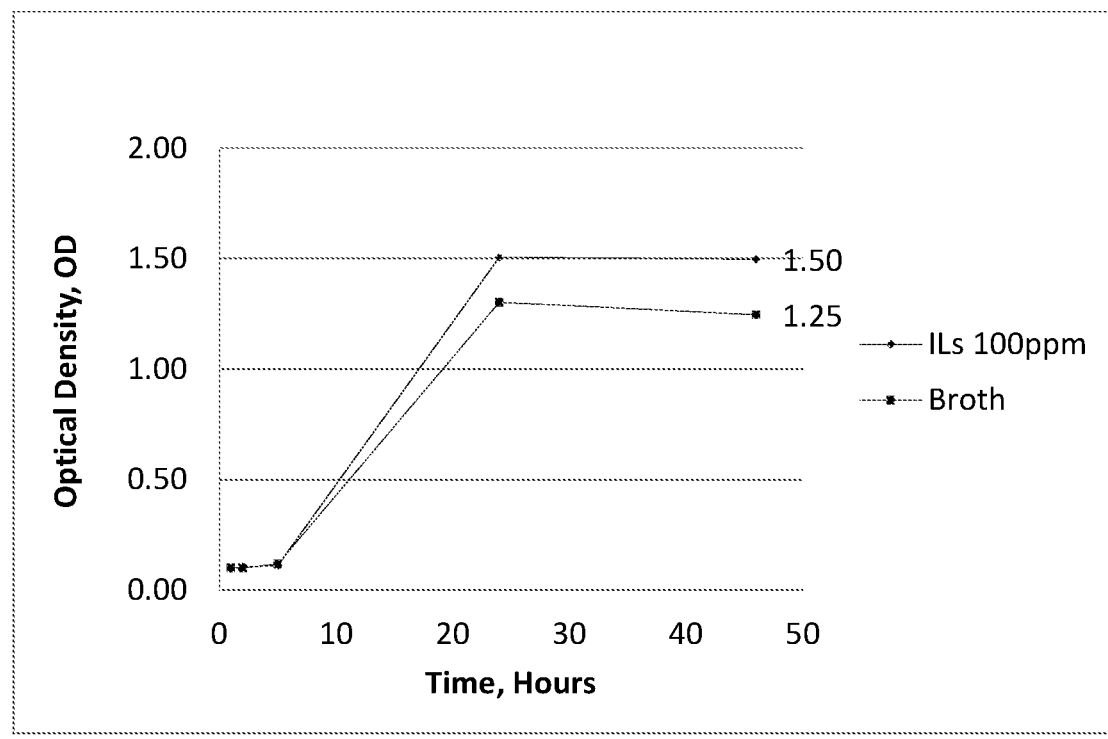
FIG. 8 depicts a graph showing growth of seawater microbe consortium over time.

FIG. 8 shows that after 48 hours, sea water microbe growth was almost 25% higher in medium supplemented with 100 ppm ionic liquids formulation as compared to the growth observed in broth medium without ionic liquids (control).

Example 4: Ionic Liquid-Enhanced Microbial Growth in Dispersed Crude Oil

Tests were conducted to investigate whether there was enhancement in microbial growth in crude oil that had been dispersed with the IL formulation.

Preparation of Crude Oil (CO) Sample 120 mL of seawater having a salinity of 3% (3 wt. % brine solution) was added to a conical flask. A volume of crude oil is added 100 uL. The mixture was shaked inside the incubator shaker for 10 minutes at 200 rpm, and allowed to settle for 10 minutes. The experiment was carried out at 25° C. and 35° C. and was kept (25±1° C.) and 35° C. respectively, unless provided otherwise. The crude oil/sea water mixture was added to 20 mL of LB broth at concentration of 100 ppm. The mixture was then added with 200 µL of microbe culture as prepared in Example 3.

Preparation of Dispersed Crude Oil (DCO) Sample 120 mL of seawater having a salinity of 3% (made by mixing 3% brine with real sea water) was added to a conical flask. To the flask was added a volume of IL formulation (dispersant) and volume of crude oil at a DOR of 1:10. The mixture was then subjected to the same steps as the CO sample.

Incubation and Measurement

Each 100 ppm ionic liquid sample/DCO/CO sample (20 mL) was provided in separate flasks. From each flask a small sample (200 µL) was pipetted into a 96-well plate to provide a blank or a background reading. The flasks were each added with 200 µL of microbe culture and incubated at 37° C. in an incubator shaker for 24 hours. After 24 hours, 200 µL of the incubated sample was pipetted into a 96-well plate. Bacterial growth was monitored by measuring turbidity at 620 nm using a microplate reader.

Results

Figure 9:
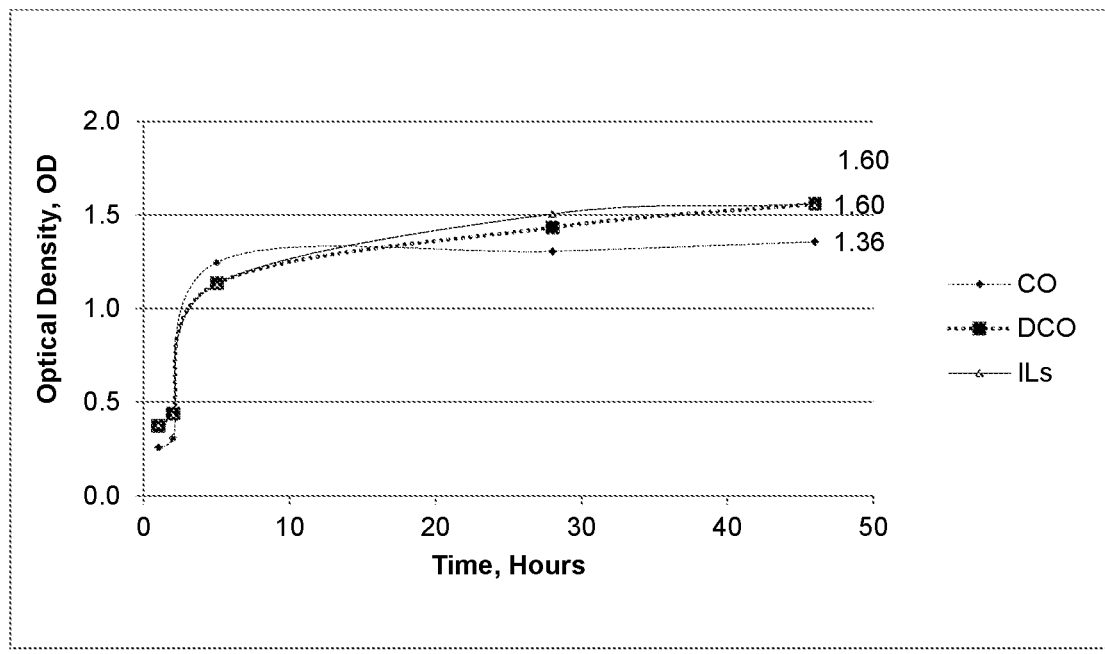
FIG. 9 depicts a graph showing growth of *Escherichia coli* over time.

FIG. 9 shows that after 48 hours, *E. coli* (gram-negative) growth was 20% higher in both mediums supplemented with 100 ppm ionic liquids formulation and dispersed crude oil (DCO) as compared to the growth observed in crude oil (CO) alone.

Figure 10:
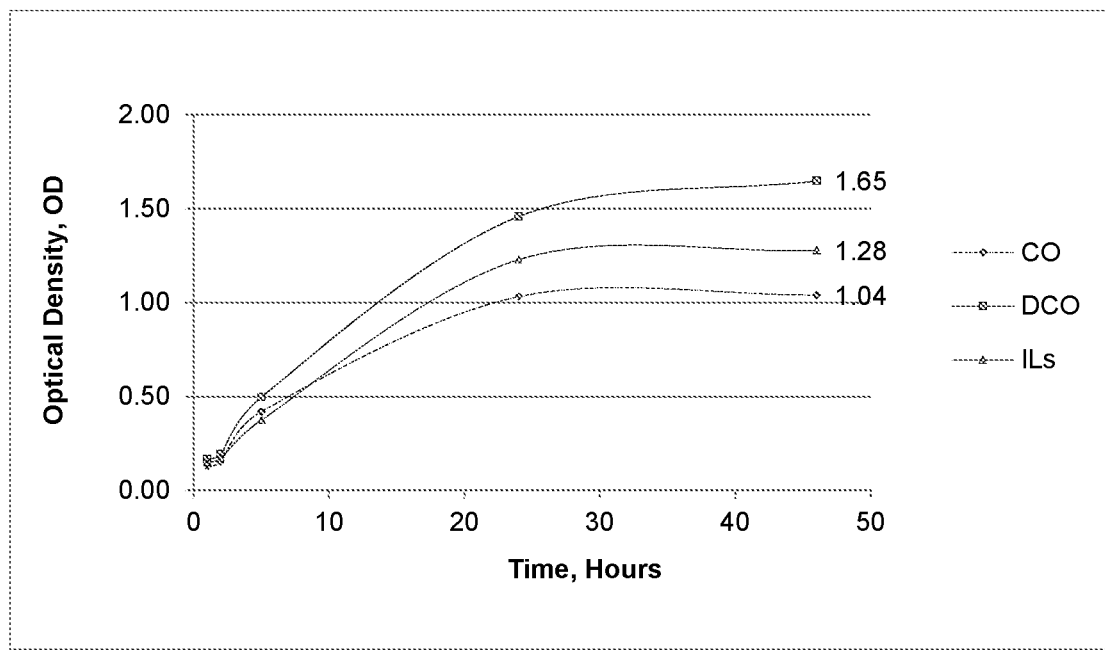
FIG. 10 depicts a graph showing growth of *Listeria monocytogenes* over time.

FIG. 10 shows that after 48 hours, *L. monocytogenes* (gram-positive) growth was 30% higher in medium supplemented with 100 ppm ionic liquids formulation as compared to crude oil alone. In medium supplemented with DCO, there is at least 70% higher growth in *L. monocytogenes* populations as compared to crude oil alone.

Figure 11:
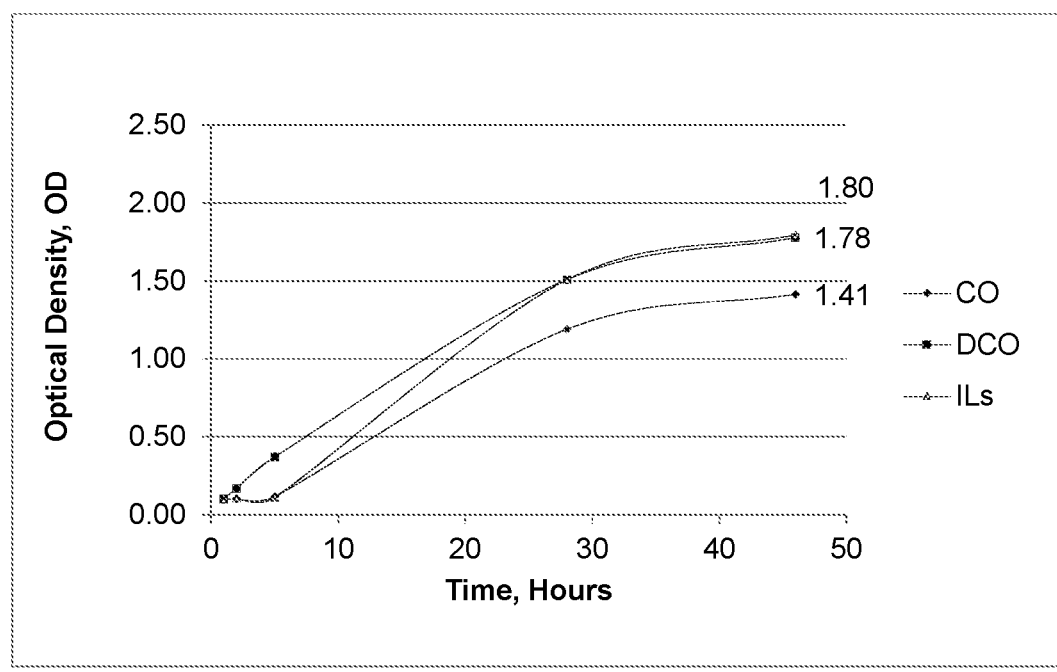
FIG. 11 depicts a graph showing growth of seawater microbe consortium over time.

FIG. 11 shows that after 48 hours, isolated seawater microbes consortium growth was almost 40% higher in both mediums supplemented with 100 ppm ionic liquids formulation and dispersed crude oil (DCO) as compared to the growth observed in crude oil alone.

These results provide evidence showing that the ionic liquid formulation boosted the growth of microbe population in dispersed crude oil, and thus shows that the formulation provides a biostimulation effect to facilitate biodegradation of crude oil.

The invention claimed is:

1. An oil dispersant composition, comprising:
   an acyl amino acid ionic liquid;
   a dicationic ionic liquid;
   a fruit acid ionic liquid;
   a polyacid ionic liquid; and
   an ethoxylate oleyl ether ionic liquid.

2. The composition according to claim 1, wherein the composition further comprises water.

3. The composition according to claim 2, wherein:
the acyl amino acid ionic liquid is present in an amount of from 2 to 15 wt %;
the dicationic ionic liquid is present in an amount of from 1 to 20 wt %;
the fruit acid ionic liquid is present in an amount of from 10 to 25 wt %;
the polyacid ionic liquid is present in an amount of from 2 to 10 wt %;
the ethoxylate oleyl ether ionic liquid is present in an amount of from 2 to 10 wt %; and
water to make 100 wt %.

4. The composition according to claim 1, wherein the acyl amino acid ionic liquid consists of:
a cation selected from one or more of the group consisting of:

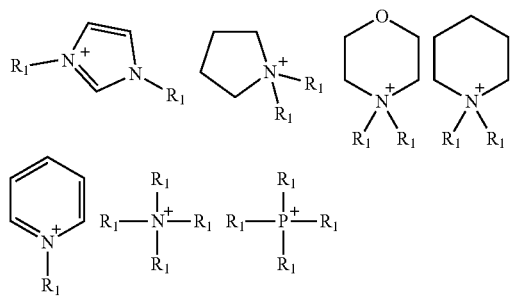

cholinium, and betaine, where each $R_1$ group is independently selected from $C_1$ to $C_4$ alkyl; and
an anion selected from one or more of the group consisting of lauroyl sarcosinate, oleoyl sarcosinate, lauroyl glutamate, oleoyl glutamate, lauroyl isethionate, and oleoyl isethionate.

5. The composition according to claim 1, wherein the dicationic ionic liquid has the formula I:

$$[[Cat]\text{-}L\text{-}[Cat]]^{2+}.2Y^- \qquad I,$$

where each [Cat] group is independently a cationic group selected from:

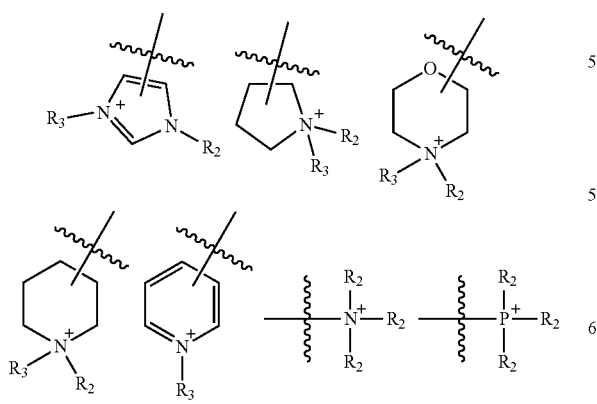

cholinium, and betaine, where:
each $R_2$ group independently represents H, or $C_1$ to $C_4$ alkyl;
each $R_3$ group independently represents $C_2$ to $C_6$ alkyl or the point of attachment of each [Cat] group to the rest of the molecule;
where the wavy line represents the point of attachment to the rest of the molecule, except in cases where the $R_3$ group represents the point of attachment to the rest of the molecule, in which case, the bond represented by the wavy line is absent;
each L independently represents a $C_2$ to $C_6$ alkylene;
each $Y^-$ is independently selected from the group consisting of a sulfonate, lauroyl sarcosinate, oleoyl sarcosinate, lauroyl glutamate, oleoyl glutamate, lauroyl isethionate, oleoyl isethionate, and a fatty acid anion.

6. The composition according to claim 1, wherein the fruit acid ionic liquid consists of:
an anionic component selected from one or more of the group consisting of citrate, lactate, succinate, glycolate, malate, and tartrate, where all carboxylic acid groups are in an anionic form; and
a cationic component selected from one or more of the group consisting of:

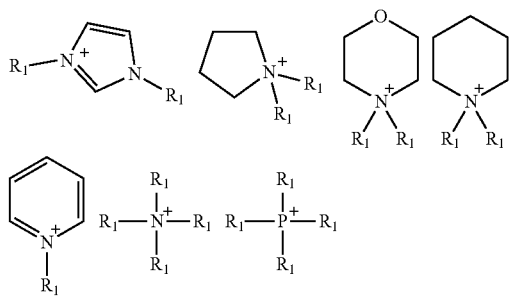

cholinium, and betaine, where each $R_1$ group is independently selected from $C_1$ to $C_4$ alkyl, and the number of cationic groups balances the number of anions in the anionic component.

7. The composition according to claim 1, wherein the polyacid ionic liquid consists of one or more polyphosphates in fully deprotonated form and cationic counterions selected from:

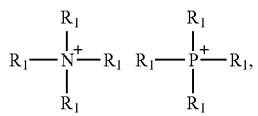

cholinium, and betaine, where each $R_1$ group is independently selected from $C_1$ to $C_4$ alkyl, and the number of cationic groups balances the number of anions in the one or more polyphosphates.

8. The composition according to claim 1, wherein the ethoxylate oleyl ether ionic liquid has the formula II:

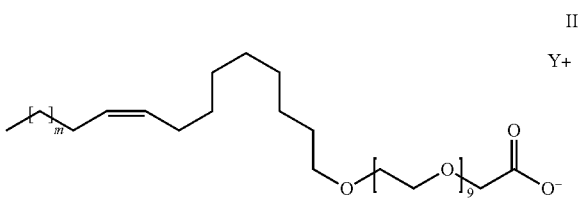

where Y is selected from:

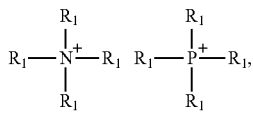

cholinium, and betaine, where each $R_1$ group is independently selected from $C_1$ to $C_4$ alkyl; and m is 5 to 7.

9. The composition according to claim 1 wherein the composition comprises:
   the acyl amino acid ionic liquid is present in an amount of from 10 to 20 wt %;
   the dicationic ionic liquid is present in an amount of from 5 to 30 wt %;
   the fruit acid ionic liquid is present in an amount of from 30 to 60 wt %;
   the polyacid ionic liquid is present in an amount of from 10 to 20 wt %; and
   the ethoxylate oleyl ether ionic liquid is present in an amount of from 5 to 15 wt %.

10. The composition according to claim 1, wherein the acyl amino acid ionic liquid is 1-butyl-3-methylimidazolium lauroylsarcosinate.

11. The composition according to claim 1, wherein the dicationic ionic liquid is a N-alkyl-N-methyl pyrrolidinium dodecyl benzenesulfonate of formula III:

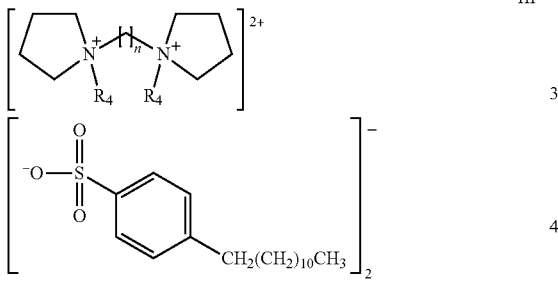

where:
each $R_4$ independently represents H, or $C_1$ to $C_4$ alkyl; and
n represents a number from 2 to 6.

12. The composition according to claim 1, wherein the fruit acid ionic liquid is a tetraalkylammonium citrate.

13. The composition according to claim 1, wherein the polyacid ionic liquid is a tetraalkylammonium polyphosphate.

14. The composition according to claim 1, wherein the ethoxylate oleyl ether ionic liquid has the formula II:

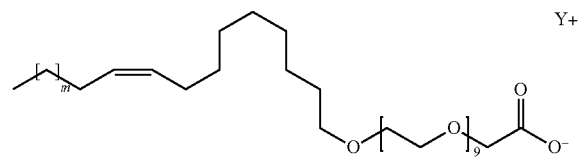

where Y is a tetralkylammonium and
m is 5 or 6.

15. The composition according to claim 1, wherein:
the acyl amino acid ionic liquid is 1-butyl-3-methylimidazolium lauroylsarcosinate;
the dicationic ionic liquid is a N-alkyl-N-methyl pyrrolidinium dodecyl benzenesulfonate of formula III:

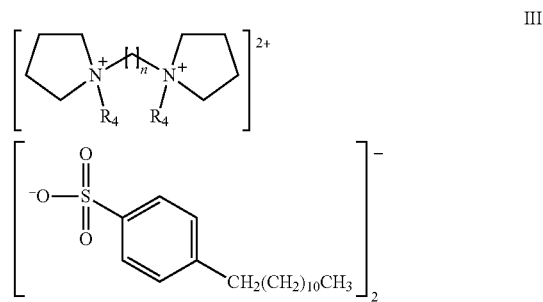

where:
each $R_4$ independently represents H, or $C_1$ to $C_4$ alkyl; and
n represents a number from 2 to 6
the fruit acid ionic liquid is tetrabutylammonium citrate;
the polyacid ionic liquid is tetrabutylammonium polyphosphate; and
the ethoxylate oleyl ether ionic liquid has the formula II:

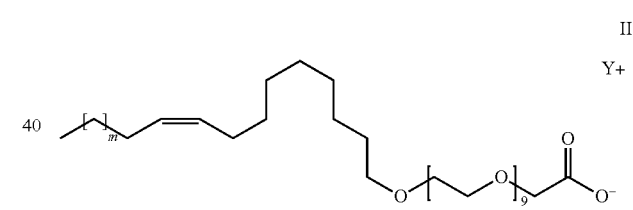

where Y is tetrabutylammonium and m is 6.

16. A method of dispersing an oil spill, which involves the step of contacting an oil in a body of water with an oil dispersant composition as defined in claim 1.

17. The method according to claim 16, wherein the oil dispersant composition is applied to the oil in a volume:volume ratio of from 1:10 to 1:100.

18. The method according to claim 16, wherein the effectiveness of the oil dispersant composition in dispersing the oil is from 45 to 100%.

19. The method according to claim 16, wherein the body of water has a salinity of from 0 to 5 wt %.

20. The method according to claim 16, wherein the body of water comprises a bacterial population and contacting the body of water with the oil dispersant composition increases the population of bacteria in the body of water.

\* \* \* \* \*